United States Patent [19]

Hirabayashi et al.

[11] Patent Number: 4,937,600

[45] Date of Patent: Jun. 26, 1990

[54] IMAGE FORMING APPARATUS

[75] Inventors: Hiromitsu Hirabayashi, Yokohama; Shunichi Masuda, Kawasaki; Yukihiro Ohzeki; Masaharu Ohkubo, both of Yokohama, all of Japan

[73] Assignee: Canon Kabushiki Kaisha, Tokyo, Japan

[21] Appl. No.: 225,719

[22] Filed: Jul. 28, 1988

[30] Foreign Application Priority Data

| | | | |
|---|---|---|---|
| Jul. 29, 1987 | [JP] | Japan | 62-189788 |
| Jul. 29, 1987 | [JP] | Japan | 62-189789 |
| Aug. 14, 1987 | [JP] | Japan | 62-202894 |
| Aug. 14, 1987 | [JP] | Japan | 62-202897 |
| Sep. 11, 1987 | [JP] | Japan | 62-229080 |
| Oct. 7, 1987 | [JP] | Japan | 62-251696 |
| Oct. 8, 1987 | [JP] | Japan | 62-252472 |
| Dec. 24, 1987 | [JP] | Japan | 62-325377 |

[51] Int. Cl.[5] .............................................. G01D 15/00

[52] U.S. Cl. .................................... 346/160.1; 346/154

[58] Field of Search ...................... 346/160.1, 150, 153, 346/154, 160; 219/216 B, 490, 494, 497

[56] References Cited

U.S. PATENT DOCUMENTS 4,778,980 10/1988 Rathbun .............................. 219/497

*Primary Examiner*—Arthur G. Evans

*Attorney, Agent, or Firm*—Fitzpatrick, Cella, Harper & Scinto

[57] ABSTRACT

An image forming apparatus includes a device operable with a first rated voltage and a second rated voltage which is different from the first rated voltage, an image forming apparatus for forming an unfixed image on an image supporting member, a fixing device for fixing the unfixed image on the image supporting member, the fixing device including a heating roller heated by a heater and a back-up roller contacted to the heating roller, the rollers starting rotation under a predetermined condition, wherein the predetermined condition is different between when the apparatus is operated with the first rated voltage and when it is operated with the second rated voltage.

41 Claims, 17 Drawing Sheets

IMAGE FORMING APPARATUS

FIELD OF THE INVENTION AND RELATED ART

The present invention relates to an image forming apparatus supplied with electric power and performing an image forming operation, more particularly to an image forming apparatus having image fixing means for fixing an unfixed image, for example.

A heating type image fixing device is generally and widely used with an image forming apparatus such as an electrophotographic copying apparatus and includes an electric heat generating element to fix on a transfer material into a permanent image a toner image having been formed on an image bearing or supporting member and having been transferred onto the transfer sheet. In such an image fixing apparatus which heat and fuse the toner image, the amount of heat generation by an electric heater greatly changes depending on the voltage of the power source therefor. Therefore, in the conventional image forming apparatus, a tolerable range of the source voltage has to be limited, and usually, the ratio of the maximum tolerable voltage to the minimum tolerable voltage is approximately 1.3 (for example, 85 V–110 V). At the maximum, it is approximately 1.5 (for example, 85 V–127 V).

At present, the rated voltages of the electric power supply in the world is generally divided into 100 V systems and 200 V systems.

The voltage ratio of 200 V system to the 100 V system is not less than 2, and for the reason described above, it is difficult to make the apparatus commonly usable with all of those systems.

The description will be made as to temperature rise characteristics of the heating roller depending on differences in the amount of heat generation by an electric heater, when a heating roller type image fixing apparatus is used. The temperature rise characteristics of the heating roller are determined by the amount of heat generation of the electric heater and an amount of heat radiation from the heating roller, and therefore, the temperature rise characteristics greatly change if the heat generation changes depending on the voltage of the power source. Among the temperature rise characteristics, the temperature rise time period until the temperature of the heating roller reaches a predetermined is concerned with a waiting period of the image forming apparatus, and therefore is important. However, it does not directly influence the quality of the image, and from this standpoint, the problem is not so significant. On the other hand, the temperature rise per unit time, that is, the temperature rise speed has a significant influence to an overshoot of the heating roller temperature, in terms of response characteristics of a temperature detector.

Referring to FIG. 4, there is shown an example of the temperature range of the heating roller when the heating roller is heated from 20° C. by 240 V, 115 V and 85 V power source without pre-operation such as a pre-rotation of the heating roller. The temperature rise speeds are 11.2° C./sec, 3.3° C./sec and 1.9° C./sec, respectively. It is understood that the overshoot temperature is increased with the increased temperature rise speed. In FIG. 4, the temperature overshoots upto 260° C. when 240 V power source is used, and to 220° C. when 115 V power source is used. The durable temperature of the heating type fixing apparatus is approximately 230° C., and when 240 V power source is used, the image fixing apparatus is liable to be broken. Even when the 115 V voltage source is used resulting in the overshoot temperature of 220° C., the temperature exceeds the upper limit of the image fixing process, and when the image fixing process is performed with such a temperature, the toner is fused so much that a high temperature toner offset takes place and the transfer material is easily curled or buckled, thus deteriorating the image quality.

SUMMARY OF THE INVENTION

Accordingly, it is a principle object of the present invention to provide an image forming apparatus which can stably operate with plural rated voltage of power sources.

It is another object of the present invention to provide an image forming apparatus which is not influenced by overshoot temperature of a heating type image fixing apparatus even if it is used with plural rated voltages.

It is a further object of the present invention to provide an image forming apparatus wherein the image forming parameters are changed in accordance with rated voltages.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
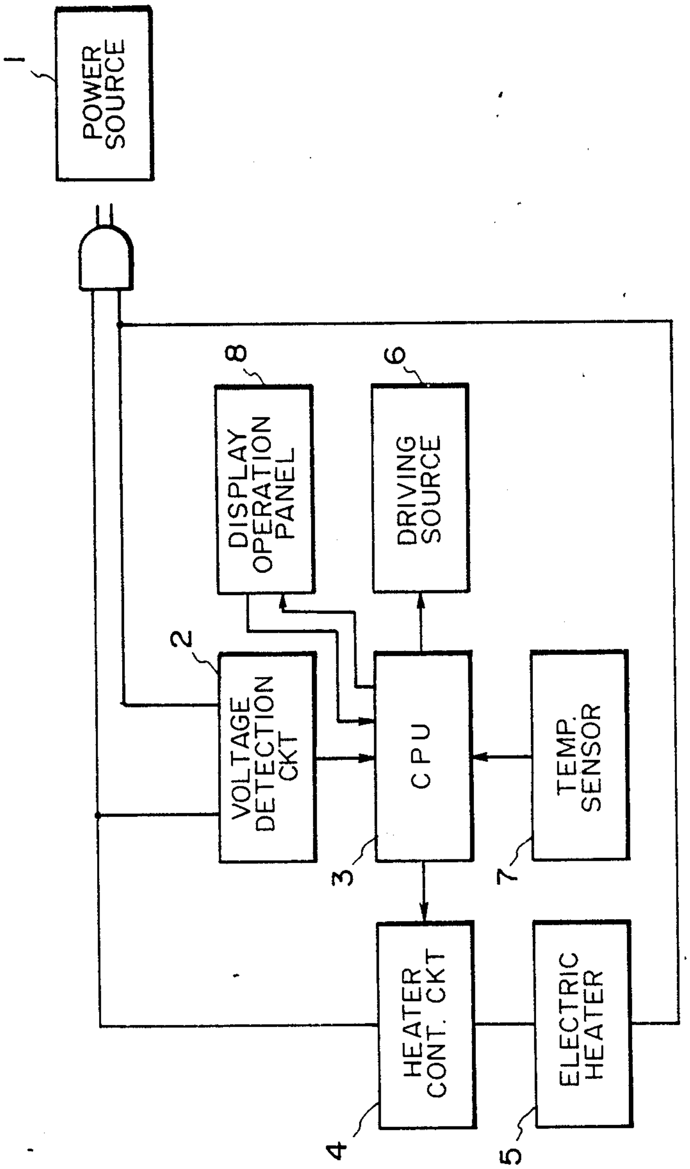
FIG. 1 is a block diagram of a control system for an image fixing apparatus according to the present invention.

Preferred embodiments of the present invention will be described in conjunction with the accompanying drawings, wherein the same reference numerals are assigned to the elements having corresponding functions.

Figure 3:
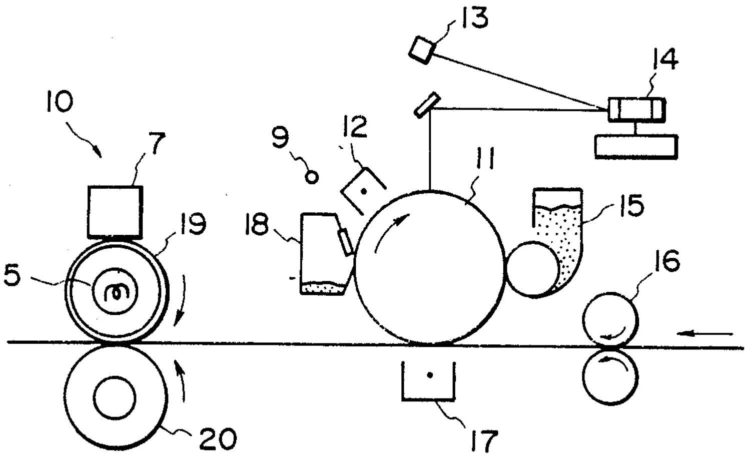
FIG. 3 is a somewhat schematic sectional view of an image forming apparatus according to an embodiment of the present invention.

Referring first to FIG. 3, there is shown a laser beam printer which is an exemplary electrophotographic apparatus to which the present invention is applicable.

The laser beam printer has a photosensitive drum 11 functioning as an image bearing member. The photosensitive drum 1 is uniformly charged by a charger 12, and then, is exposed to a laser beam having been produced in accordance with an image information signal by a laser source 13, by way of a laser scanning device 14 including a rotational polygonal mirror for scanning the photosensitive drum. By this, an electrostatic latent image is formed on the photosensitive drum 11 in accordance with the image information. The electrostatic latent image on the photosensitive drum 11 is visualized with toner made of thermoplastic resin or the like by a developing device 15. The visualized image is transferred by a transfer charger 17 onto a transfer sheet which is fed to the photosensitive drum 11 in timed relation with the visualized image by a sheet feeding device 16. Thereafter, the photosensitive drum 11 is cleaned by a cleaner so that the toner remaining thereon is removed. Then, the photosensitive drum is uniformly illuminated by a preexposure lamp 9, so as to be prepared for the next image forming operation. The transfer sheet having received the toner image is advanced to a heating type fixing apparatus 10, which fixes the toner image into a permanent image by heating means. The heating means includes a heating roller 19 containing a heater 5 and a pressing roller 20 press contacted to the heating roller 19 and following it for rotation. The surface temperature of the heating roller 19 is detected by a temperature detector (thermister) 7, and a control operation is performed to maintain the temperature constant. The transfer sheet having been subjected to the heat fixing operation, is discharged outside the apparatus.

Referring now to FIG. 1, the control system for the heat-fixing apparatus 10 is shown. In this Figure, a power source 1 can provide a wide range of voltages, 84 V–264 V, the ratio of the maximum to the minimum being more than 2. The power source supplies the power to the image forming apparatus containing the heat-fixing apparatus 10. A voltage detection circuit 2 detects the voltage of the power source, and a signal indicative of the detected voltage is transmitted to a central processing unit (CPU) 3. The electric heater, functioning as a heat generating element provided in the heat-fixing apparatus 10 is electrically connected to the power source through a heater control circuit 4, and is responsive to a signal from the CPU 3 to produce heat. The surface temperature of the roller is detected by the temperature sensor 7 provided to the heating roller 19, and a signal indicative of the detected temperature is transmitted to the CPU 3.

The heating roller 19 is mechanically coupled to a driving source 6 which is controlled by a signal from the CPU 3 so as to be controlled in its rotation. A display and operation panel 8 is connected to the CPU 3 for displaying the state of the image forming apparatus and for operating it.

The description will be further made with respect to a heat-fixing apparatus 10 which is important in this invention. The fixing apparatus 10 in this embodiment has an effective fixing width (length) of 212 mm, the fixing process speed of 50 mm/sec (8 sheets of A4 size/min.), fixing process temperature of 180° C., the upper limit of fixing process temperature of 200° C. and the lower limit thereof of 170° C. The heating roller 19 includes a base member which is an aluminum cylinder having an outside diameter of 25 mm and a thickness of 1.4 mm, a heat durable back coating on its inside surface, and a releasing outer surface layer made of a fluorine resin such as PFA and PTFE. The entire length of the roller is 252 mm. The roller receives a driving force at a longitudinal end thereof from a driving source 6. The roller is rotatably supported. Inside the heating roller 19, there are disposed a halogen lamp heater 5 as an electric heat generating element (electric heater) having a heat generating length of 226 mm and having a power of 400 W when supplied with 115 V power. The heat generation thereof is controlled by a heater control circuit 4 which is controlled by the CPU 3 in accordance with the detection by a thermister 7 (temperature sensor) disposed to the outside of the heating roller 19. To the heating roller 19, a pressing roller 20 is press- contacted which includes a core metal and an elastic layer made of silicone rubber or the like and having a thickness of 6 mm. The pressing roller has an outer diameter of 24 mm and a total length of 226 mm. The width of a nip formed between these rollers is 3 mm. The image fixing process is performed by rotation of those rollers. The power source systems in the countries in the world are generally divided into 100 V systems and 200 V systems, and to meet this, an image forming apparatus having a heating type image fixing device having an electric heater as heat generating source is produced separately for those systems, and in many cases, it is produced separately for 100 V system, 115 V system, 220 V system and 240 V system. The image forming apparatus according to this invention is usable with all of those power supply systems. More particularly, it is usable in a wide range of the voltages, wherein the ratio of the maximum tolerable voltage to the minimum tolerable voltage is at least 2. Assuming that the power supply varies −15%–+10% with respect to the rated voltage, the image forming apparatus according to this invention is usable with a wide range extending from 85 V–264 V.

Table 1 gives effective power of a heater and temperature rise characteristics of the heating roller 19 when the electric heater 5 is used with the voltages of 85 V–264 V in this embodiment. The effective power Pl of the halogen lamp heater 5 satisfies:

$$P1 = P0(Vi/Vo)^{1.54}$$

where Vo is the rated voltage, P0 is a rated power, and Vi is a voltage of the power source.

As will be understood from Table 1, it varies widely depending on the voltage of the power source, more particularly, it is 251 W at 85 V, 1438 W at 264 V. As for the temperature rise characteristics of the heating roller 19, the temperature rise per unit time (temperature rise speed in °C./sec) and the time period (temperature rise time in sec) required for the temperature reaching from the room temperature of 20° C. to the fixing process temperature of 180° C, are given. The temperature rise characteristics are measured on the basis of the actual temperature of the heating roller. The thermister 7 has such response characteristics that when it is kept at a room temperature (20° C.) and is pressed to a constant temperature cylinder of 180° C., the time period (response period) until 63.2 % temperature change of a predetermined resistance change is 3 sec.

TABLE 1

Temp. Rise Characteristics of Heating Roller

| SOURCE VOLT. (V) | HEATER POWER (W) | TEMP. RISE SPEED (°C./S) | TEMP. RISE PERIOD (S) |
|---|---|---|---|
| 85 | 251 | 1.9 | 83 |
| 100 | 322 | 2.6 | 62 |
| 115 | 400 | 3.3 | 49 |
| 127 | 466 | 3.9 | 41 |
| 187 | 845 | 7.5 | 22 |
| 220 | 1086 | 9.7 | 17 |
| 240 | 1241 | 11.2 | 15 |
| 264 | 1438 | 13.0 | 13 |

Figure 4:
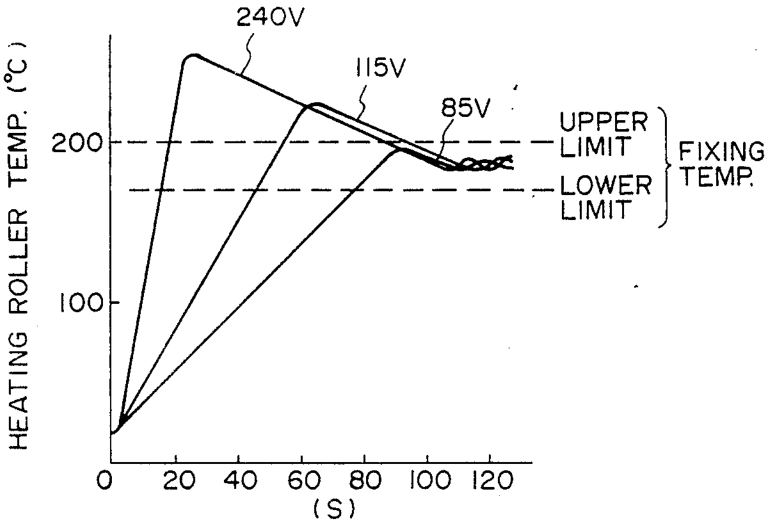
FIGS. 4 and 5 are graphs of a heating roller temperature vs. time, in comparison examples.

As described hereinbefore, FIG. 4 shows the temperature change of the heating roller when it is heated from 20° C. by 240 V, 115 V, 85 V voltage sources without prerotation of the heating roller. The overshoot, which is concerned with the temperature rise speed of the heating roller and with the response characteristic of the thermister, is increased with the increased temperature rise speed and with the response time. As regards the response characteristics of the thermister, various improvements have been made, but good results are not yet obtained because of the existence of a protection layer such as a sliding layer and air layer for the purpose of protection of the thermister and the heating roller between the thermister element 8 and the heating roller 19.

The inventors particularly take note of decreasing the overshoot by reducing the temperature rise speed when high voltage power source is used. The temperature rise speed of the heating roller 19 is mainly dependent on the heat capacity of the heating roller 19 and the amount of heat generation by the heater 5, more particularly, it is inversely proportional to the heat capacity and is proportional to the amount of heat generation. In consideration of these, even if the amount of heat generation is increased by the increased voltage of the power source, the temperature rise speed can be decreased to some extent by increasing the heat capacity. According to the present invention, a pressing roller 20 presscontacted to the heating roller 19 is utilized for this purpose. More particularly, during the heating of the heating roller, both of the rollers 19 and 20 are rotated idly, so that the heat capacity of the heating roller 19 is in effect, increased, by which the overshoot is decreased.

Figure 2:
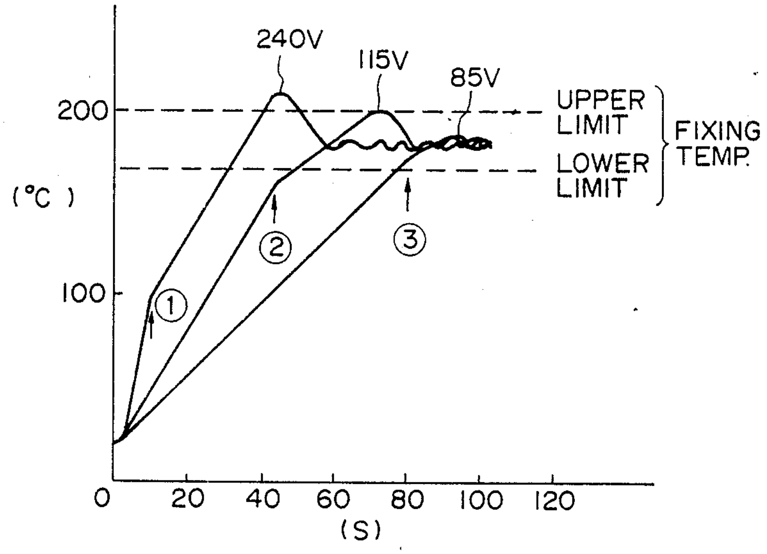
FIG. 2 is a graph of a temperature of a heating roller vs. time.

Referring to FIG. 2, there are shown thermal characteristics of the heat-fixing apparatus according to this embodiment. More particularly, there is shown a temperature change of the heating roller 19 when the heating roller 19 is heated from 20° C. by 240 V, 115 V, 85 V voltage sources with the prerotation of the fixing apparatus being performed in accordance with the voltage of the power source. If this is compared with FIG. 4, the effects of the present invention will be understood.

In FIG. 2, at the point of time (1) when the thermister 7 detects 80° C. (240 V power source), the driving source 6 shown in FIG. 1 is driven to start rotation of the rollers 19 and 20, and the rotation is continued until after the overshooting over 180° C. occurs, the temperature of 180° C. is again detected. As shown in FIG. 4 by (1), when the rollers start to rotate, the temperature rise speed of the heating roller 19 decreases, and the overshoot can be limited to approximately 210° C. On the contrary, the temperature decrease of the heating roller 19 after the overshooting, is increased. The time period during which the temperature is beyond 200° C. which is an upper fixing process temperature limit is remarkably reduced as compared with FIG. 4. Thus, upon 240° V power source, by rotating the rollers 19 and 20, the overshoot temperature can be reduced, and the time required for the heating roller temperature to be stabilized in the fixable temperature range can be reduced.

When the voltage of the power source is 115 V, the rollers 19 and 20 are started to rotate at the point of time (2) when the thermister detects 140° C., by which the overshoot temperature can be limited to approximately 200° C. When an 85 V voltage source is used, the rollers are started to rotate at the point of time (3), when the thermister detects 165° C. When the voltage of the power source is 85 V, the overshoot temperature is already low, as shown in FIG. 4, and therefore, it is not necessary to rotate the rollers for the purpose of reducing the overshoot. If, however, the temperature of the pressing roller 20 is low when the fixing process operation starts, the rotation of the rollers 19 and 20 decreases the temperature of the heating roller 19 by the thermal connection between the pressing roller 20 and the heating roller 19. When the voltage is 85 V, the electric power for the halogen lamp heater 5 functioning as a heat generating source is very low, and therefore the recovery of the decreased temperature is delayed, with the result that a transfer sheet is fixed at the initial stage with a temperature lower than the minimum fixable temperature. For this reason, the prerotation is effective to stabilize the image fixing operation even at the low voltage of the power source. In this case, it is a possible alternative that the prerotation starts at 180° C., and the image fixing operation is started after a predetermined period of time elapses.

A specific voltage source detecting circuit 2 may not be used, in which case the operator discriminates the power source, and actuates a voltage selection switch (not shown) which may be provided on the operation panel 8, for example, to produce a signal to be transmitted to the CPU 3. In this embodiment, the description has been made as to the voltages of 85 V, 115 V and 240 V. However, it is a possible alternative that the voltages are divided more finely, and the sequences are changed for each 1 V. On the contrary, the voltage may be divided into two voltages, such as 100 V system and 200 V system.

Additionally, the halogen lamp heater is used for the heat generating element or the electric heater, but this is not limiting, and the present invention is applicable to other electric heat generating elements such as a nichrome wire heater or the like, if the amount of heat generation changes depending on the power source.

In the foregoing embodiment, the prerotation sequence is changed depending on the heating roller temperature, but it is possible that consideration may be made to a time factor, and the prerotation is continued for 30 sec after 80 ° C. is detected when the voltage is 240 V.

Another embodiment of the present invention will be described. The structure of the fixing apparatus is similar to that of FIG. 3, with the exception that the halogen lamp heater provides the power of 350 W when supplied with 115 V, that the heating roller has an outer diameter of 20 mm and a thickness of 1 mm, that the elastic layer of the pressing roller has a thickness of 5 mm and that the nip width is 2.5 mm.

The characteristics of the thermister 7 are the same as in the foregoing embodiment. Table 2 shows the effective power and the temperature rise characteristics of the heating roller 19 when the electric heater is supplied with various voltages ranging from 85 V to 264 V.

TABLE 2

Temp. Rise Characteristics of Heating Roller

| SOURCE VOLT. (V) | HEATER POWER (W) | TEMP. RISE SPEED (°C./S) | TEMP. RISE PERIOD (S) |
|---|---|---|---|
| 85 | 219 | 3.1 | 52 |
| 100 | 282 | 4.1 | 40 |
| 115 | 350 | 5.3 | 32 |
| 127 | 407 | 6.2 | 26 |
| 187 | 739 | 11.6 | 14 |
| 220 | 950 | 15.0 | 12 |
| 240 | 1086 | 17.2 | 10 |
| 264 | 1258 | 20.0 | 9 |

Figure 5:
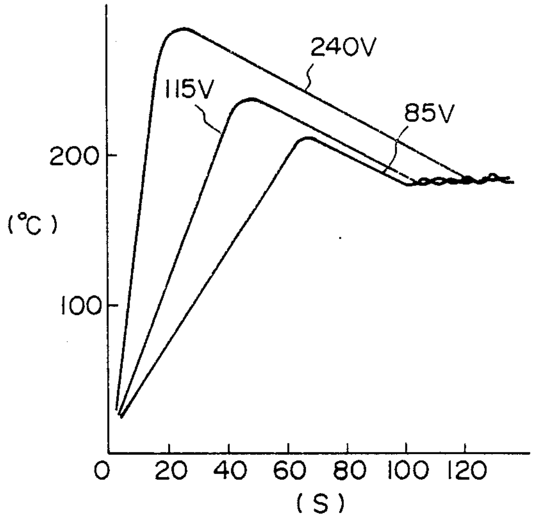

FIG. 5 which is similar to FIG. 4 shows the temperature change of the heating roller when the heating roller 19 is heated from 20° C. by the power sources having 240 V, 115 V and 85 V without the prerotation of the heating roller, as a comparison example relative to this embodiment. The overshoot, which is concerned with the temperature rising speed of the heating roller and with the response characteristics of the thermister, and increases with the increased temperature rise speed and is increased with the slowness of the response.

In this embodiment, the temperature rise speed of the heating roller is substantially decreased to reduce the overshoot by stopping the heat generation of the electric heater for a predetermined period of time at a temperature lower than a target temperature of the control (stopping temperature).

It is preferable that use is made of the pressing roller 20 press contacted to the heating roller 19 by rotating rollers 19 and 20 idly when the heat generation of the electric heater is stopped, that is, the heat capacity of the heating roller 19 is substantially increased, thus further decreasing the overshoot.

Figure 6:
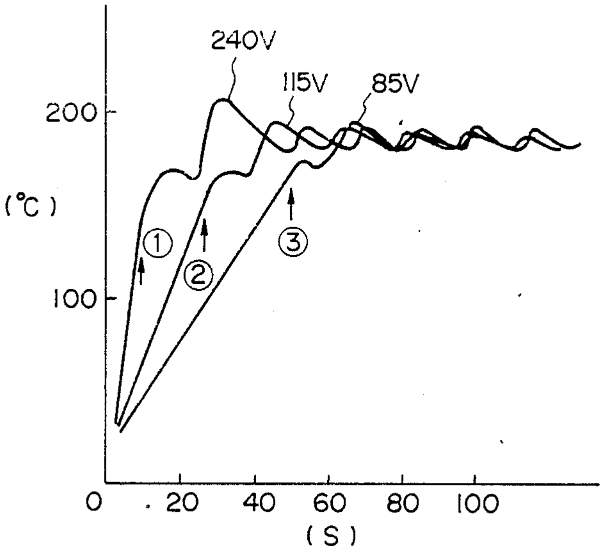
FIGS. 6 and 7 are graphs of heating roller temperature vs. time, according to this invention.

FIG. 6 shows the thermal characteristics of the fixing apparatus according to this embodiment. More particularly, the temperature change of the heating roller 19 when it is heated from 20° C. with the heat generation stopping temperature and period changed depending on the voltage of the power source. If this is compared with FIG. 5, the effects of the present invention will be understood.

In FIG. 6, at the point of time (1) when the thermister detects 100° C. upon 240 V, the heater control circuit 4 is actuated to stop the heat generation for a predetermined period of time, 15 sec in this embodiment. During this 15 sec period, the heating roller 19 continues to rise in temperature. After the 15 sec elapses, the temperature detected by the thermister becomes lower than 180° C., and the heater 5 is again energized to heat the heating roller 19 until the temperature detected by the thermister, is higher than 180° C. By controlling the fixing apparatus in this manner, the overshoot can be limited approximately to 210° C. The time period during which the temperature of the heating roller 19 after the overshoot is above the fixable maximum temperature of 200° C., becomes remarkably reduced as compared with that of FIG. 5. Therefore, when the voltage is 240 V, the overshoot temperature is decreased, and the time period until the temperature of the heating roller is stabilized in the fixable temperature range is reduced. When the voltage is 115 V, the heater control circuit 4 is operated when the thermister detects 130° C. at the point of time (2). The heat generation is stopped for 10 sec. during the heating period of the heating roller 19. During the 10 sec. period, the heating roller 19 continues to rise in temperature, and after the 10 sec. elapses, the temperature detected by the thermister becomes lower than 180° C. Then, the heater 5 is again energized to heat the heating roller 19 until 180°C. is detected. By controlling the fixing apparatus in this manner, the overshoot can be limited to approximately 200° C. When the voltage is 85 V, the heater control circuit 4 is operated at the point of time (3) when the thermister detects 170° C. And, the heat generation is stopped for 5 sec. During this 5 sec. period, the heating roller 19 continues to be increased in temperature. After 5 sec. elapses, the temperature detected by the thermister becomes lower than 180° C. The heater 5 is again energized to heat the heating roller 19 until 180° C. is detected. By controlling the image fixing apparatus in this manner, the overshoot temperature can be limited to approximately 200° C.

If the stoppage of the heat generation is performed in the same manner in the low voltage condition and the high voltage condition, the temperature rise period at the low voltage is significantly large. In this embodiment, the heat generation stopping temperature and/or the heat generation stopping period is changed depending on the magnitude of the voltage of the used power source.

According to this embodiment, the stopping temperature and/or stopping period is changed depending on the voltage of the power source, and therefore, the temperature rise period is limited within a predetermined range, and the overshoot can be reduced remarkably as compared with the comparison example shown in FIG. 5.

It is possible, in an image forming apparatus having a similar structure, that a stand-by temperature control is performed at a temperature lower than the fixing process temperature. The stand-by temperature control is performed for the purpose of decreasing power consumption of the image forming apparatus and preventing a thermal deterioration of the fixing apparatus (for example, the deterioration of the pressing roller having a silicone rubber layer).

The stand-by temperature is determined in consideration of the temperature rise characteristics of the heating roller and is so set that the temperature of the heating roller reaches a fixing process temperature during the time period from the start of the image forming operation to the start of the fixing process. If the difference between the stand-by temperature and the heating process temperature, the problem of the above described overshoot arises. Therefore, the present invention is effective in this case because it can select the heat generation stopping temperature and the heat generation stopping period to minimize the overshooting.

In this embodiment, the rollers 19 and 20 are rotated at the stand-by temperature control. Both of the rollers 19 and 20 are started to rotate at least simultaneously with the stoppage of the heat generation, so that the heat capacity of the heating roller 19 is substantially increased, and that the overshoot can be minimized.

A further embodiment of the present invention will be described. The structure of the fixing apparatus is similar to that of FIG. 3, that is, the same as the second embodiment of the present invention.

The inventors have taken particular note of decreasing the temperature rise speed upon use of high voltage source by reducing a time average amount of heat generation of the heating element, by which the overshoot is reduced. According to this embodiment, the average amount of heat generation by the heater is very properly controlled by changing a duty ratio of effective power supplied to the heat generating element in accordance with the voltage of the power source used. According to this embodiment, the average amount of heat generation of the heater is time-controlled using the heater control circuit 4 controlled by the CPU 3 in accordance with an output of a source voltage detection circuit 2.

Figure 7:
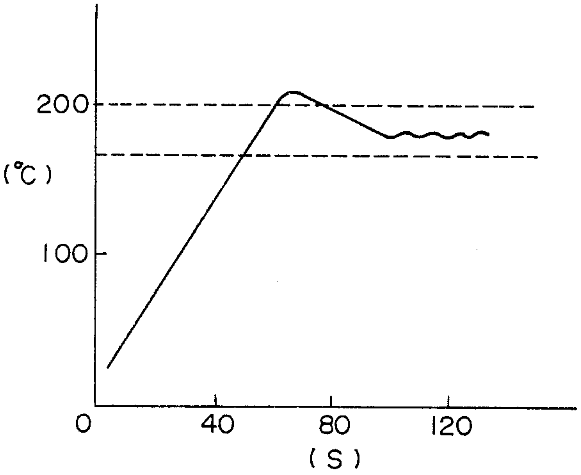
Figure 8:
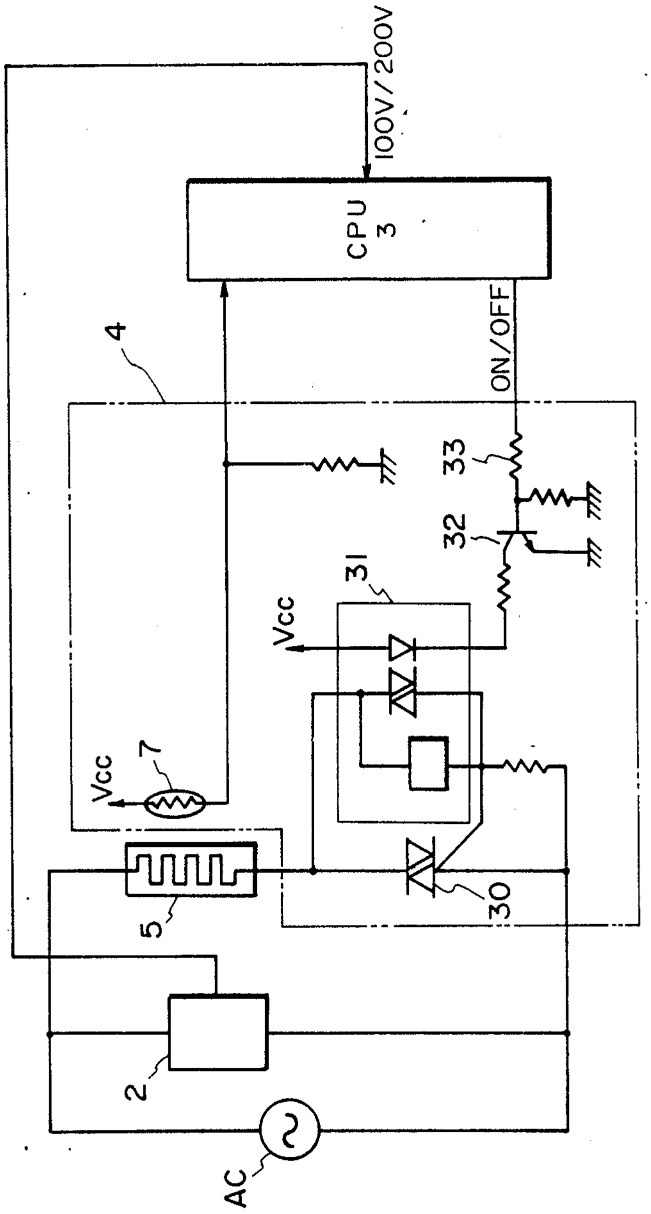
FIG. 8 is a circuit diagram of a control system according to another embodiment of the present invention.
Figures 9A, 9B, 9C, 9D, 9E, 9F:
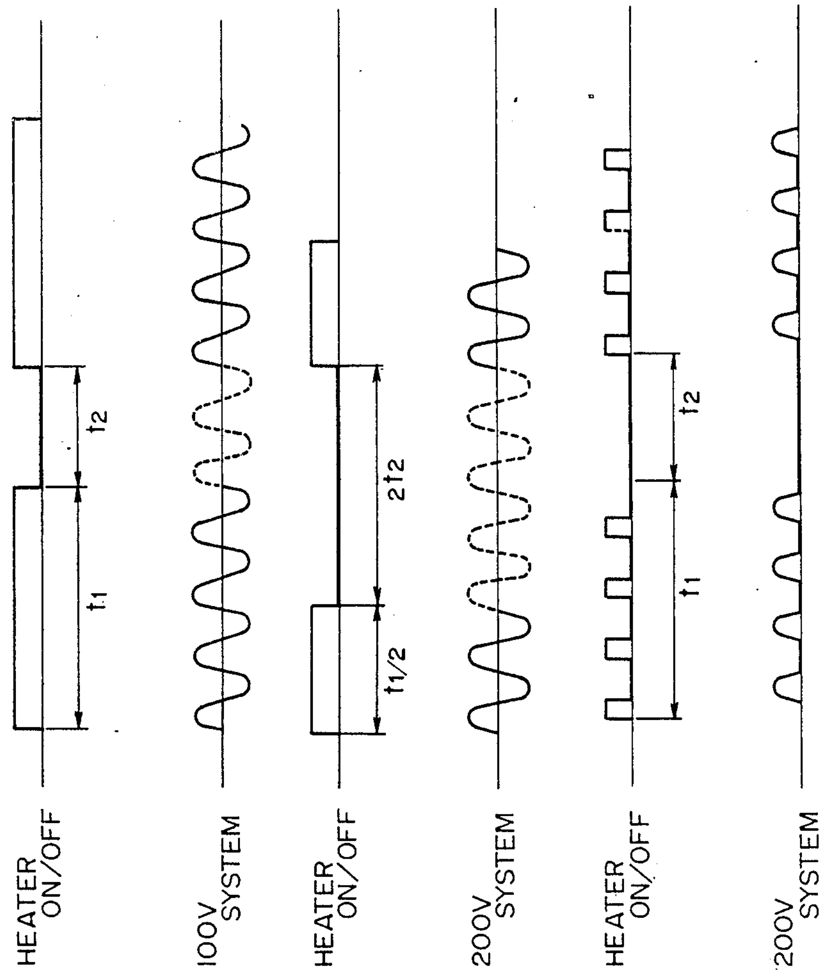
FIGS. 9A, 9B, 9C, 9E and 9F show waveforms of electric power in an embodiment of the present invention.

FIG. 7 shows thermal characteristics of a heat fixing apparatus, more particularly, a temperature change of the heating roller 19 when the heating roller 19 is heated from 20° C. with the duty ratio of the effective power supplied to the heater changed in accordance with the voltage of the voltage source. If this is compared with FIG. 5, the effects of the present invention will be understood. Referring to FIGS. 8 and 9, means for changing the duty ratio of the effective power to the heater in accordance with the voltage of the source used according to the foregoing embodiment, is shown.

In FIG. 8, the source voltage detection circuit 2 is connected to an AC voltage source, and the voltage of the power source used is detected. The output signal from the source voltage detecting circuit 2 is transmitted to the CPU 3 as a voltage detection signal.

The heat generating element 5 is connected to the AC input power source and also to a heater control circuit 4 for on-off-controlling the heat generating element 5. The heater control circuit 4 is provided with a thermister 7, and a signal from the thermister 7 is transmitted to the CPU 3. A controlling element (TRIAC) 30 of the heater control circuit 4 is connected between the heater 5 and the AC input source. To a gate of the triac 30, a phototriac 31 is connected for triggering the triac 30. To a secondary side of the PHOTOTRIAC 31, a transistor for on-off-controlling a light emitting diode for actuating the PHOTOTRIAC 31 is connected. A base of the transistor 32 is connected to the CPU 3 through a resistor 33.

With this structure, the CPU 3 discriminates the detection signal of the AC input voltage and a signal from the thermister, and produces an on-off control signal for controlling the heater to actuate the transistor 32. By this, the PHOTOTRIAC 31 operates, and in accordance with the trigger signal of the PHOTOTRIAC 31, the triac 30 is actuated, and the heater 5 is energized to start the heat generation. When the thermister 7 detects that the temperature of the heat generating element 5 has reached a predetermined temperature, the signal indicative of this event is transmitted to the CPU 3 so as to stop the on-off signal for the heater control is stopped, so that the energization of the heater 5 is stopped. Next, the description will be made as to a means for controlling the duty ratio of the effective power supplied to the heater 5 in accordance with the voltage of the used voltage source.

Referring to FIG. 9, (a) and (b) show heater control signal timing (the heater is energized at $t_1$ and is deenergized at $t_2$) and an AC waveform when the source voltage provides 100 V. FIGS. 9(*c*), (*d*) show the same when the voltage is 200 V. As shown, when the power source is 100 V, the heater 5 is energized during four cycles and deenergized during two cycles, whereas when the voltage is 200 V, the heater is energized during two cycles and deenergized during four cycles. In this manner, the duty ratio of the effective power supplied to the heater 5 is changed depending on the voltage source used, by which the effective power supplied to the heat generating element 5 is made substantially equal when the used voltage is 100 V and 200 V.

FIG. 9 shows at (e) and (f) another embodiment in which the effective power upon 200 V is made equal to that upon 100 V. In this embodiment, the heater 5 is energized during four cycles and is deenergized during two cycles, but as shown, the energization is effected with a half wave, and as a result, the effective power upon 200 V is equal to that upon 100 V. Therefore, irrespective of the voltage difference of the used voltage source, the heater 5 produced substantially the same temperature characteristics, as shown in FIG. 7, to bring about the predetermined temperature.

By controlling the fixing apparatus in this manner, the overshoot is limited to approximately 210° C. at maximum. In addition, the temperature decrease of the heating roller 19 after the overshoot is increased, therefore, the time period during which the temperature is beyond the maximum fixable process temperature of 200° C. is remarkably reduced as compared with the comparison example show in FIG. 5. The time period required for the temperature of the heating roller is stabilized in the fixable temperature range.

When the stand-by temperature control is effected, the duty ratio of the effective power supplied to the heater is properly selected in accordance with the used voltage in accordance with the present invention, by which the overshoot can be minimized.

In this embodiment, both of the rollers 19 and 20 are rotated during the stand-by control period. However, when both of the rollers are rotated, the level of the duty ratio may be changed from that for the case of the rollers not rotated.

The description will be made with respect to a further embodiment.

Usually, a heat-fixing device, is provided with a malfunction detection means as a safety means to detect abnormal condition of the heat generation in order to prevent damage by heating beforehand. As for the malfunction detecting means, there are two types, i.e., a hardware malfunction detecting means such as thermostat, a heat fuse or the like and software malfunction detection means by which the thermal characteristics of the heating device such as the temperature rise speed and the energization period to the electric heater or other factors are converted to values, and a predetermined target region is determined, and when data outside the region are detected, the malfunction is detected.

The hardware malfunction detection means is usually used for a final detection means, and therefore, it is possible that when the malfunction detection means operates, the image forming apparatus has already been significantly damaged. On the other hand, the software malfunction detection means does not give significant influence to the image forming apparatus even if it operates, if the determinations are property effected. In this sense, it is preferable from the standpoint of safety, and therefore, the significance thereof is large.

However, the software malfunction detecting means is usually based on the thermal characteristics of the heat fixing apparatus as described hereinbefore, and therefore, the tolerable region has to be made wide when the heat generation amount changes. This decreases the safety upon occurrence of the malfunction. When the image forming apparatus usable with plural rated voltage sources, particularly when the ratio of the maximum tolerable voltage to the minimum tolerable voltage is not less than 2, the amount of the heat generation by the heater significantly changes. Therefore, malfunction is erroneously detected, on the contrary, the malfunction is not detected even when the malfunction actually occurs, so that the power supply to the heater is not correctly shut-off.

Figure 10:
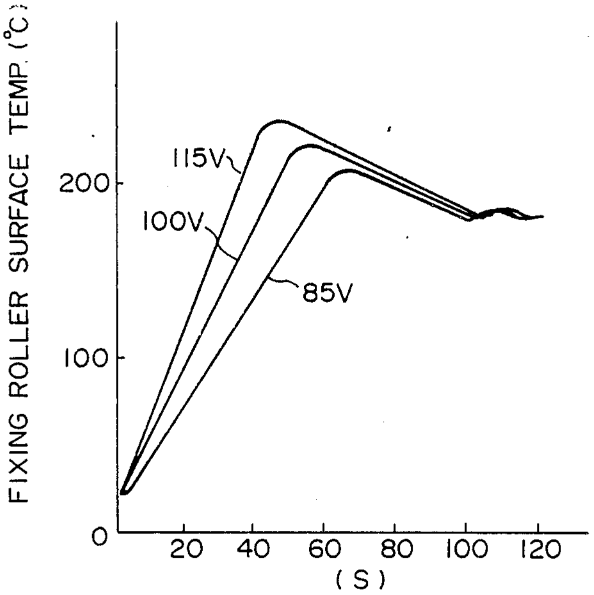
FIGS. 10, 11, 12, 13, 14, 15 and 16 are graphs of the surface temperature of a heating roller vs. time, in embodiments of the present invention.
Figure 11:
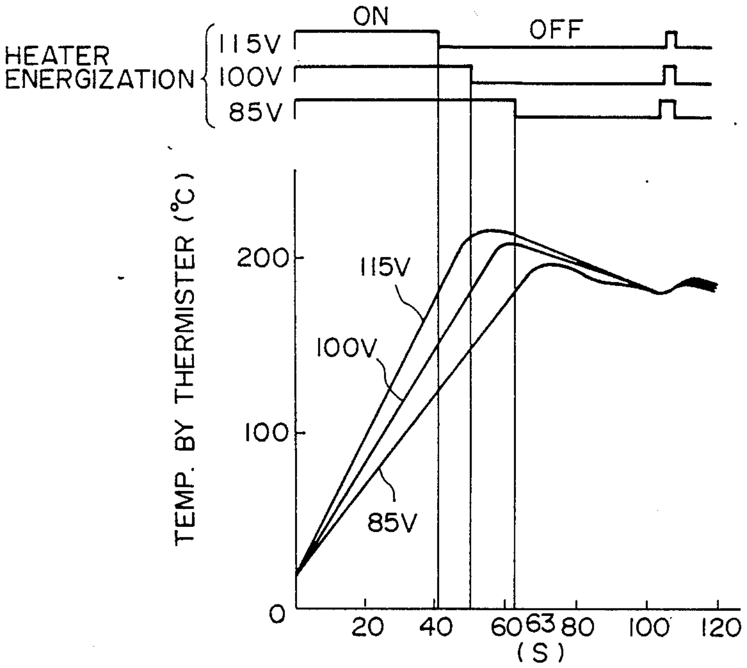

In FIG. 10 and 11, there is shown a change in the temperature detected by the thermister and the temperature of the heating roller when the heating roller is heated from 20° C. by the power source providing 85 V, 100 V, 115 V and 127 V without prerotation of the heating roller in this embodiment.

The temperature control of the heating roller is performed on the basis of the temperature detected by the thermister, as described hereinbefore, and therefore, the actual temperature of the surface of the heating roller is higher than the temperature detected by the thermister due to the unavoidable delay in the response of the thermister, and the overshoot can not be avoided. In this embodiment, when the energization of the electric heater continues for a predetermined period of time (T sec), a malfunction of the heating device is deemed as occurring on the basis of the energization signal, so that the energization of the heater is stopped, and the warning is displayed. This is accomplished by the software malfunction detecting means.

The energization of the electric heater is detected by a timer circuit, and the heater energization signals are integrated, and the heater energization signal is cleared. According to the present invention, the malfunction occurs when the temperature of the heating roller does not rise due to breakage of the electric heater, or when the temperature rise of the heating roller can not be detected due to failure of the thermister even if the temperature of the heating roller sufficiently rises.

The above-described constant T can be determined in the following manner.

The duration of the heater energization is longest when the voltage is low, that is, when the voltage of the power source is 85 V, and the temperature of the heating roller is low. Referring to FIG. 11, the energization period is 63 sec. To meet a low room temperature, a margin of 5 sec is given, with the result that the constant time period T is 68 sec.

Figure 12:
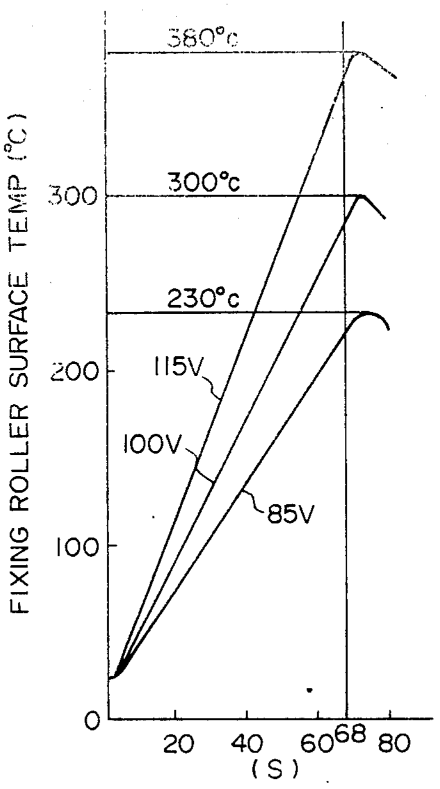

As shown in FIG. 12, when the heater is continuously energized for 68 sec from the temperature of 20° C. due to the failure of the thermister, for example, the heating roller temperature increases up to approximately 230° C. when the voltage is 85 V. Since the durable temperature of the heating roller is usually 260° C., and therefore, the heating roller itself is not damaged, and the fixing device can be repaired by exchanging the thermister. Therefore, no problem arises. However, when the voltage is 100 V or 115 V, the temperature reaches 300° C. or 380° C., so that the heating roller is so much heated that it is damaged, with the result that the heat-fixing apparatus has to be exchanged. If the temperature reaches 380° C., the fixing device or the transfer sheet can smoke.

In consideration of the above, according to the present invention, the time duration constant T is changed in accordance with the voltage used. For example, as shown in FIG. 11, the energization duration constant T is 68 sec for 85 V source, 55 sec. for 100 V source and 46 sec. for 115 V. Therefore, referring back to FIG. 1, when the voltage detecting circuit 2 detects the voltage, the detection signal is transmitted to the CPU 3, and the constant T of the timer circuit in the heater control circuit 4 is determined in accordance with the voltage of the power source.

Figure 13:
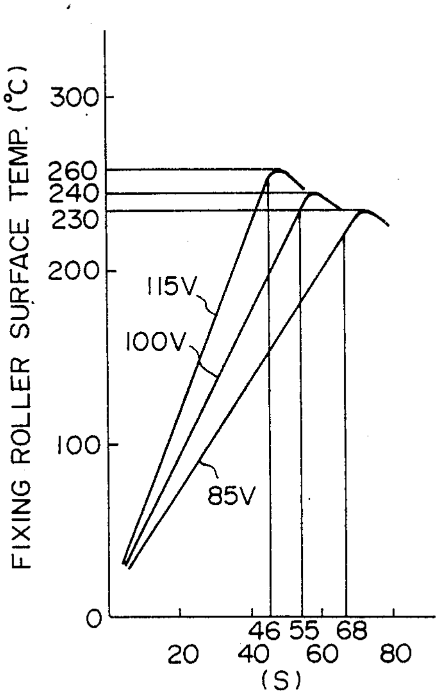

According to this embodiment, even if the electric heater is continuously energized from 20° C. due to the failure of the thermister, the maximum temperature of the heating roller is 230° C., 240° C. and 260° C. when the voltage is 85 V, 100 V and 115 V, respectively, as shown in FIG. 13, and therefore, the heating roller is not damaged. The heat-fixing apparatus can be used if only the thermister is exchanged.

The foregoing description has been made in relation to the three voltages, i.e., 85 V, 100 V and 115 V. However, the maximum energizable period to the heater corresponds to the power source, and therefore it is possible to properly determine the constant T for another voltage. It is possible that the constant T is determined for each of divided two or three regions of the voltage, for example, for high voltage source and low voltage source.

As described, according to this embodiment, the conditions on which the malfunction is detected is changed in accordance with the voltage with which the apparatus is used, and therefore, the malfunction can be detected with certainty.

Next, another embodiment of the present invention will be described. This invention is different from the foregoing embodiment in that the outer diameter of the heating roller is 25 mm; the thickness is 2.5 mm; the image forming apparatus is usable with the voltage of the voltage source ranging from 85 V–264 V; and the electric heater is 400 W when used with 115 V voltage source. The temperature rise characteristics of the heating roller in the heat-fixing apparatus is shown in Table 3. In the image forming apparatus usable with a wide region of the voltage as in this embodiment, the temperature rise speed of the heating roller greatly changes with the voltage of the used voltage source.

Figure 14:
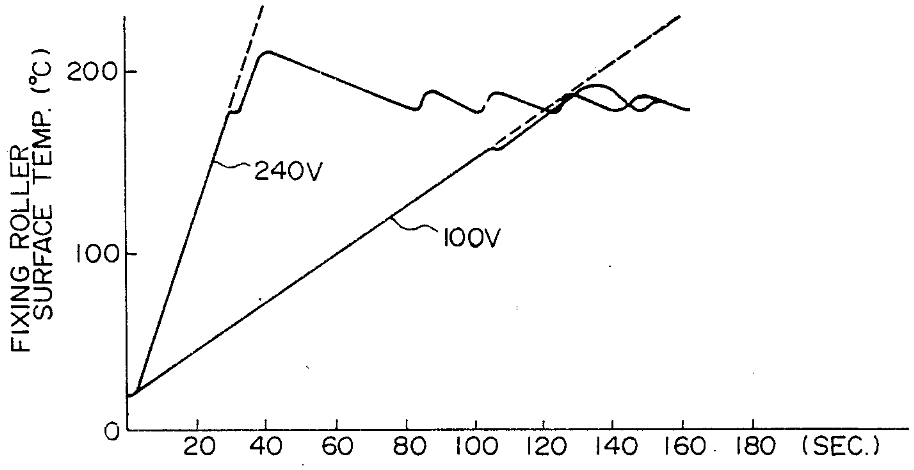
Figure 15:
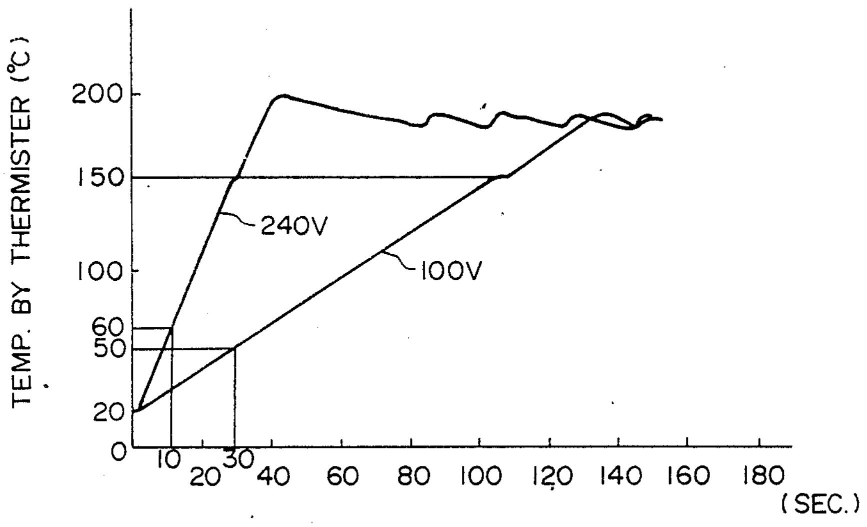

FIG. 14 shows the temperature rise characteristics when the voltage is 100 V and 240 V. FIG. 15 shows the temperature detected by the thermister.

TABLE 3

Temp. Rise Characteristics of Heating Roller

| SOURCE VOLT. (V) | HEATER POWER (W) | TEMP. RISE SPEED (°C./S) | TEMP. RISE PERIOD (S) |
|---|---|---|---|
| 85 | 251 | 0.9 | 163 |
| 100 | 322 | 1.3 | 117 |
| 115 | 400 | 1.8 | 90 |
| 127 | 466 | 2.1 | 75 |
| 187 | 845 | 4.2 | 39 |
| 220 | 1086 | 5.5 | 30 |
| 240 | 1241 | 6.4 | 26 |
| 264 | 1438 | 7.5 | 22 |

In this embodiment, as shown in FIG. 14, in order to reduce the overshoot at the temperature rise, the energization of the heater is forcibly stopped for two sec when the temperature of 150° is detected. If the temperature of the roller does not reach 180° C. after the stoppage, the heater is reenergized.

In this embodiment, the overshoot can be further reduced by utilizing the pressing roller 20 press-contacted to the heating roller 19 to rotate idly both of the rollers 19 and 20 during the non-energization of the electric heater, in other words, by substantially or in effect increasing the heat capacity of the heating roller 19.

In this embodiment, the image forming apparatus is used with the voltage ranging from 85 V–264 V, and therefore, the variation of the temperature rise speed is further enlarged as compared with the foregoing embodiments, and therefore, the present invention is more effective.

In this embodiment, the malfunction detection is performed at an early stage after a predetermined period of time elapses from start of the heater energization. The temperature of the heating roller is detected by the thermister after a predetermined period of time elapses from power-on, and if the temperature does not reach a predetermined level, the malfunction is discriminated, and the energization of the heater is stopped together with warning display, the predetermined temperature being determined to be the temperature which is reached after the predetermined time, when the heating means correctly operates.

More particularly, referring to FIG. 15, when the fixing apparatus operates correctly with the voltage of 240 V of the power source, the thermister detects approximately 40° C. after 10 sec. from the power-on. Therefore, assuming that the minimum usable ambient temperature is 10° C., the temperature of the heating roller must reach 50° C. after 10 sec. Therefore, if the temperature detected by the thermister is lower than 50° C. after 10 sec. from the power-on with the voltage of 240 V, the malfunction is discriminated. Similarly, when the voltage of the voltage source is 100 V, the temperature rise is 30° C. in 30 sec. Assuming that the minimum usable ambient temperature is 10°C., the temperature of the heating roller must reach 40° C. after 10 sec. Therefore, if the temperature detected by the thermister after 30 sec. from the power-on is lower than 40° C., a malfunction of the fixing apparatus is discriminated. With the other voltages, the malfunction of the fixing apparatus is detected by properly setting the relation between the thermister detected temperature and the time elapsed after the power on. They may be stepwisely set in accordance with the voltage regions.

According to this embodiment, the malfunction can be detected earlier than the foregoing embodiment because the malfunction is discriminated on the basis of two values, i.e., the temperature and the time period from the power-on. In this embodiment, the time period after the power-on is detected by a timer circuit added to the CPU 3 in FIG. 1.

In this invention, the heating apparatus is not limited to the heating type image fixing apparatus, but is applicable to various heating devices such as those for prevention of dew condensation, for heating the photosensitive member and for heating transfer sheets.

The description will be made as to a further embodiment by which the overshoot of the temperature rise of the heating roller is prevented. The fixing apparatus has the same characteristics as shown in Table 2.

According to this embodiment, the average amount of heat generation by the heater is properly controlled by changing the maximum continuous energization period and energization stopping period of the heater in accordance with the voltage of the power source used. In this embodiment, the average amount of heat generation of the heater is controlled by time-controlling the heat generation of the heater by the heater control circuit 4 and the CPU 3 on the basis of the detection by the source voltage detection circuit 2. In this embodiment, the overshoot can be further reduced by utilizing the pressing roller 20 press contacted to the heating roller 19 to rotate the rollers 19 and 20 idly at least during the stoppage of the heat generation of the heater, in other words, by substantially increasing the heat capacity of the heating roller 19.

Figure 16:
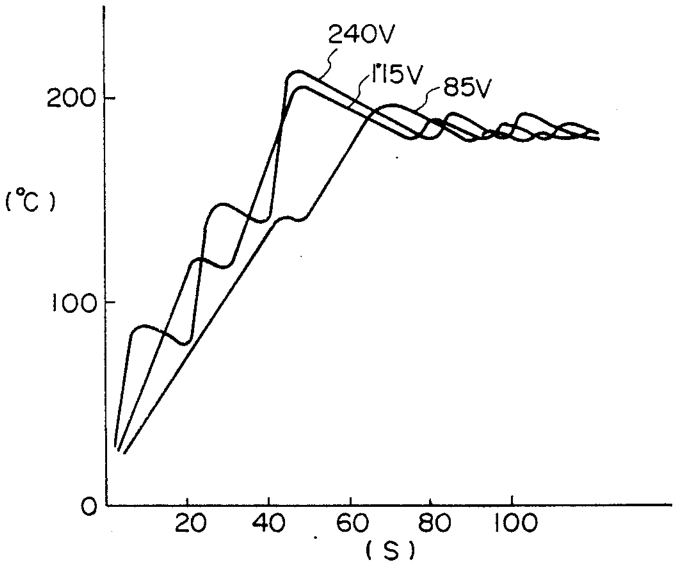

FIG. 16 shows thermal characteristics of the fixing device according to this embodiment, more particularly the temperature change of the heating roller when it is heated from 20° C. with the maximum continuous heat generation period and heat generation stoppage period (interruption) changed with the source voltage. If this is compared with FIG. 5, the effects of the present invention will be understood.

In FIG. 16, when the voltage is 240 V, the maximum continuous energization period is 5 sec., and the stoppage period is 15 sec; when it is 115 V, the maximum continuous energization period is 20 sec., and the stoppage period is 10 sec.; when it is 85 V, the maximum continuous energization period is 40 sec., and the stoppage period of 10 sec. The temperature is stepwisely increased. By this control of the fixing apparatus, the overshoot temperature is limited to approximately 210° C. at maximum. Also, the temperature decrease speed of the heating roller 19 after the overshoot is increased, and the time period in which it is beyond 200° C. which is the upper limit of the fixing process temperature is remarkably reduced as compared with the comparison example of FIG. 5. The time period until the heating roller temperature is stabilized in the fixable temperature region is reduced.

In this embodiment, the power source voltage is detected by the voltage detection circuit 2, and the energization time control is effected using the heater control circuit 4 in accordance with the source voltage already set in the CPU 3. Depending on the setting of the time control, the temperature rise characteristics at the respective voltage can be made substantially equal.

According to this embodiment, the maximum energization continuing period and the stoppage period are changed in accordance with the power source voltage, so that the temperature rise time can be within a predetermined range, and the overshoot can be remarkably reduced, as compared with the comparison example of FIG. 5.

Figure 17:
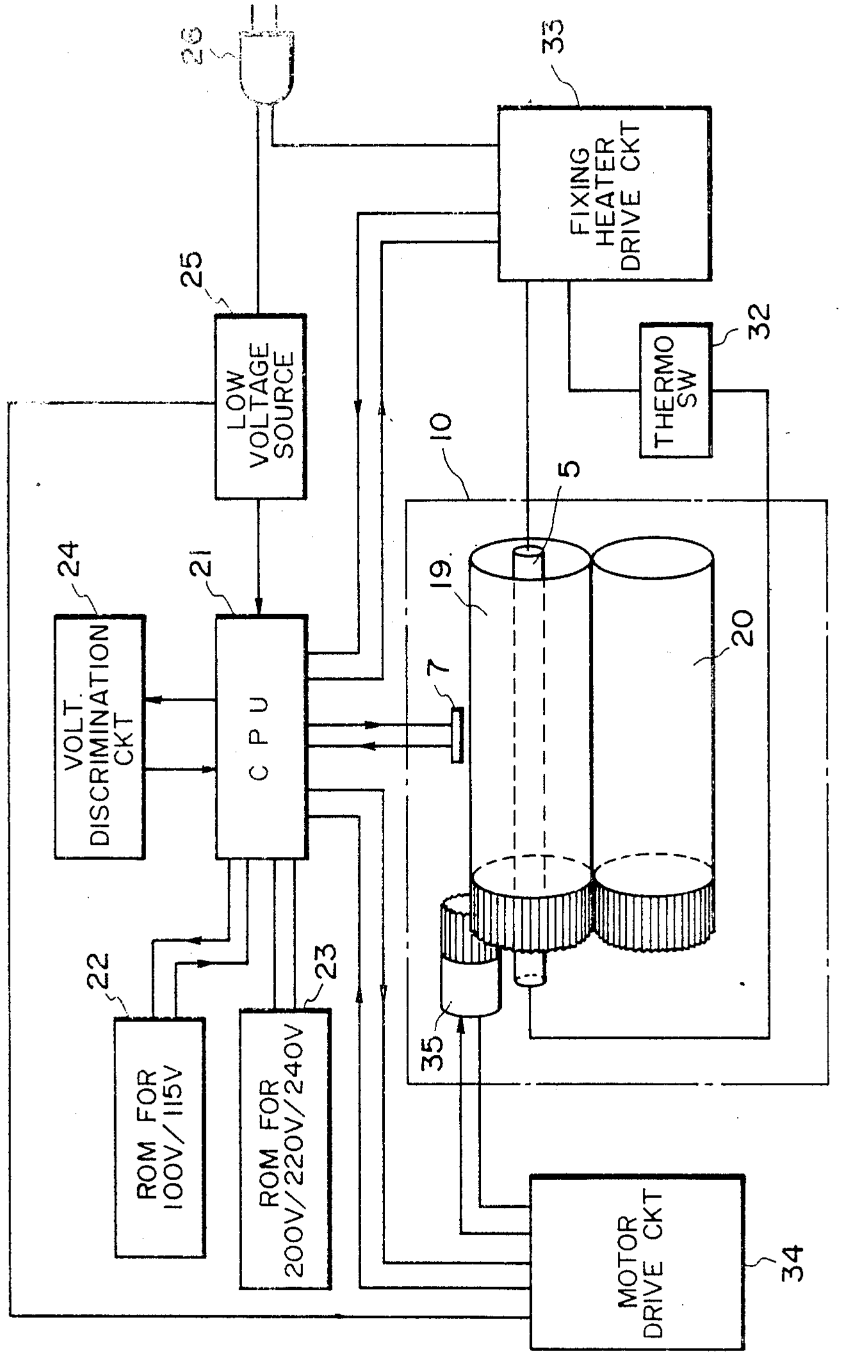
FIG. 17 is a block diagram of a control system used with an embodiment of the present invention.

A further embodiment of the present invention will be described. FIG. 17 shows a block diagram of control means for controlling the fixing apparatus 10 of the image forming apparatus according to this embodiment.

The fixing apparatus 10 includes a fixing roller 19 and a pressing roller 20 press contacted to the fixing roller 19 and rotated thereby. The fixing roller 19 has in its inside a heater 5 functioning as a heat generating member (a halogen heater of rated voltage and power of 240 V and 1100 W). A fixing heater drive circuit 33 which receives a signal from a CPU 21 (central processing unit) to control the heat generation of the heater 5 within a predetermined range and a thermoswitch 32 for shutting the energization when the drive circuit 33 fails, are connected to the heater 5. To the left end of the fixing roller 19, a main motor 35 is disposed to rotate the fixing roller 19 in a predetermined direction by way of gears. To the main motor 35, a motor drive circuit 34 for controlling the rotation of the motor 35 in accordance with a signal from the CPU 21, is connected.

The CPU 21 which is the central part of the control means is connected to a low voltage source 25 which receives power from commercial power source supplied from plug 26 and reduces the voltage, and is connected to a voltage discrimination circuit 24 for discriminating the voltage of the commercial power on the basis of the voltage from the low voltage source 25. The low voltage source 25 and the voltage discrimination circuit 25 of this embodiment can be switched by manual switch between 100 V/115 V side or 200 V/220 V/240 V side.

The CPU 21 is further connected to ROMs 22 and 23 as memory means memorizing the temperature control sequence for the fixing apparatus in accordance with the voltage of the voltage source and to a temperature detecting element 7 (thermister) for detecting the surface temperature of the fixing roller 19. In this embodiment, ROM 22 stores the content of the first sequence control corresponding to the power source of 100 V/115 V, whereas the ROM 23 stores the content of the second sequential control corresponding to the voltage 200 V/220 V/240 V. The ROMs 22 and 23 store program sequences effective to set the supply power to the heater 8 to a level suitable for the fixing operation in accordance with the voltage level of the voltage of the commercial source and effective to quickly raise the surface temperature of the fixing roller to a target temperature, and thereafter, maintaining the temperature at the target temperature.

The sequence control by the CPU 21 and the ROMs 22 and 23 in this embodiment will be described. When the commercial power supply provides 100 V, the low voltage source 25 and the voltage discrimination circuit 24 is switched to 100 V/115 V side, and the voltage of 100 V is supplied from an outlet 26. Then, a predetermined low voltage is supplied to the voltage discrimination circuit 24 through the CPU 21, and the circuit 24 discriminates that the supplied voltage is 100 V/115 V, and a signal indicative of this is transmitted to the CPU. The CPU, receiving this signal, selects a sequence from the ROM 22 for the sequential control for 100 V/115 V. Then, the control of the heat generation for the heater 5 of the fixing apparatus is started.

Figure 18:
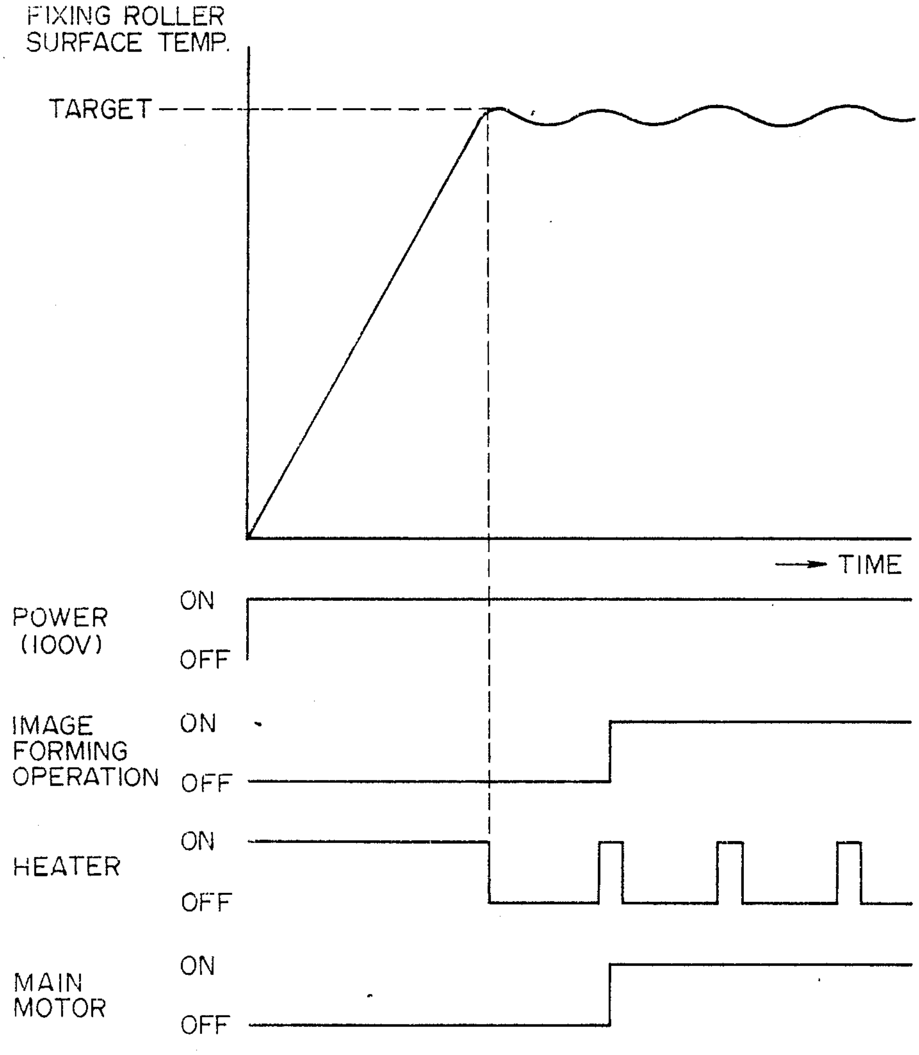
FIGS. 18 and 19 are graphs of a heating roller temperature vs. time, in an embodiment of the present invention.
Figure 19:
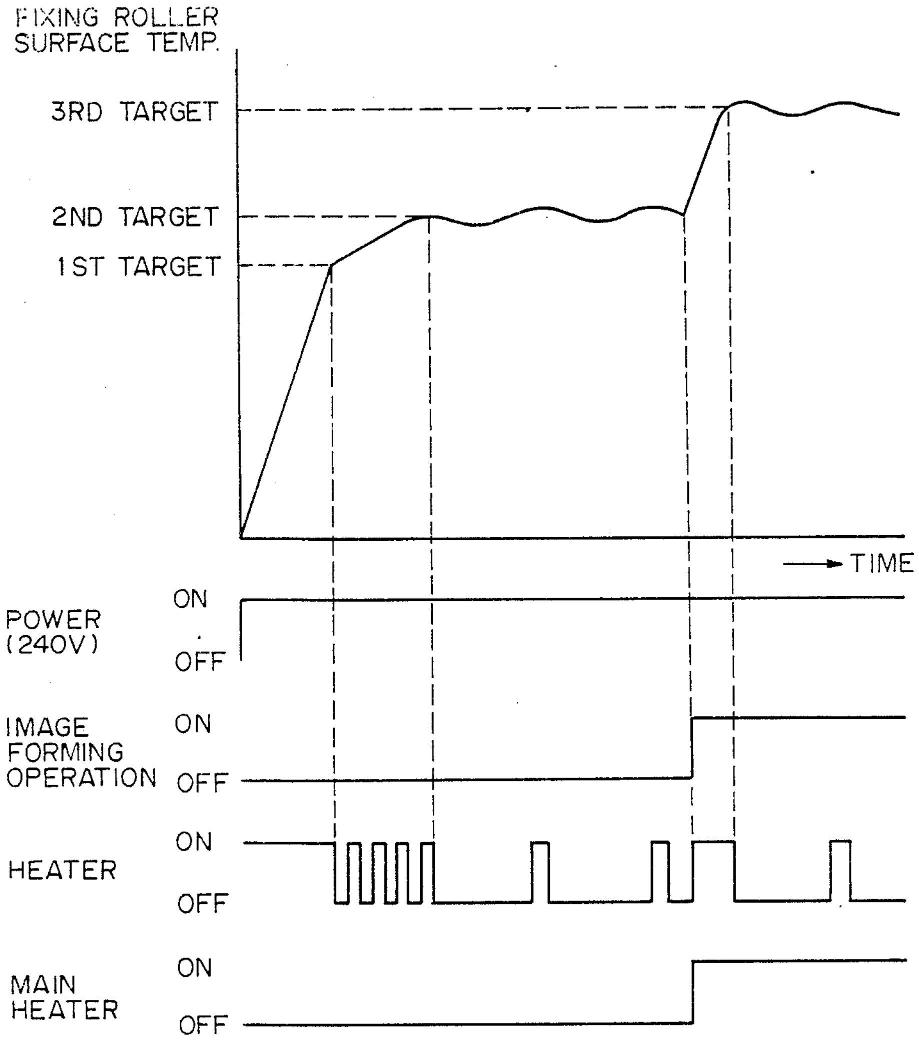

When the sequential control by the ROM 22 is started by the CPU 21, the power for the heater 5 is set to a predetermined level (approximately 300 W in this embodiment) to provide a sufficient heat generation of the heater 5 to provide the toner fixing temperature of the fixing roller 19 surface, and then, as shown in FIG. 18, the heat generation amount of the heater 5 is controlled so that the surface temperature of the fixing roller 19 is controlled. FIG. 19 shows the surface temperature of the fixing roller 19 vs. time to show the behavior of the control, and simultaneously the on-off states of the power source, image forming operation, heater and main motor with elapse of time. Referring to this Figure, when the thermister 7 detects that the surface temperature of the fixing roller 19 reaches a target temperature (approximately 180° C. when the voltage is 100 V), the CPU 21 controls the heat generation amount of the heater 5 to maintain the target temperature. At the point of time when the surface temperature of the fixing roller reaches the target level, the instruction of the image forming operation is enabled. By the input button, the image forming operation is started, so that the main motor 35 is rotated to perform a usual image formation. The CPU 21 continues to control the heat generation amount of the heater 5 to maintain the target temperature. Where the apparatus of this embodiment is operated with commercial power supply providing 240 V, the low voltage source 25 and the voltage discrimination circuit 24 one switched to 200 V/220 V/240 V side, and the power of 240 V, for example, is supplied from the outlet 26. The voltage discrimination circuit 24 detects that the supply voltage is 200 V/220 V/240 V, and the signal indicative of the detection is transmitted to the CPU 21, and it starts the temperature control of the fixing apparatus. In this case, the CPU 21 selects the ROM 23 for the sequential control for 200 V/220 V/240 V.

When the control of the ROM 23 by the CPU 21 is started, the power of the heater 5 is set to be approximately 1100 V. The CPU 21, similarly to the case of 100 V, controls on the basis of the temperature detected by the thermister 7. The control is as shown 19, which is different from FIG. 18 of 100 V case, because if the sequential control described above for 100 V is used for 240 V, the heater 5 is overheated. Therefore, there are provided a first target temperature (100° C. in this embodiment), a second target temperature (160° C. in this embodiment) and a third target temperature (180° C. in this embodiment). By providing three stages of target temperatures, the surface temperature of the fixing roller 19 is increased relatively quickly without overshoot. This will be described more in detail referring to the Figure. Up to the first target temperature 100° C., the CPU 21 maintains the energization of the heater 5 to quickly increase the temperature, and the temperature is detected by the thermister 7. Thereafter, up to the second target temperature 160° C., the heater 5 is intermittently energized to increase the temperature less steeply. When the thermister 7 detects that the surface temperature of the fixing roller 19 reaches the second target temperature, the image forming operation of the image forming apparatus is enabled. In this case, the second target temperature is 160° C. which is not sufficiently high for fixing the toner image, but if the operation start instruction is produced, the CPU 21 controls the heat generation amount of the heater 5 to quickly increase it to the third target temperature 180° C. which is sufficient for fixing the toner image, and during the image fixing operation, the heat generation amount is controlled to maintain the third target temperature, and therefore, there is no problem. By controlling in this manner, the overshoot in the case of 240 V can be prevented.

As described hereinbefore, according to this embodiment, the apparatus is usable for a wide range of the voltages of the commercially available power source, ranging from 140 V to 240 V, for example. In addition, the heat generation control for the heat generating means in the fixing apparatus is stably performed, and therefore, the fixing property can be guaranteed.

A further embodiment will be described. In the foregoing embodiment, the CPU 21, the ROM 22 for 100 V/115V and ROM 23 for 200 V/220 V/240 V are employed, and one sequential control is provided for 100 V and 115 V. In this embodiment, respective sequences are provided for 100 V and 115 V. By doing this, the control for the 100 V source and the 115 V source are more stably performed than in the foregoing embodiment. Similarly, if the sequences are provided for 200 V, 220 V, 240 V, respectively, the stabilized controls are possible for each of the voltages The low voltage source 25 in this embodiment can be automatically switched by detecting wave height and an initial temperature increase rate, and the voltage discrimination circuit **24*b*** may be an automatic one using known means.

Figure 20:
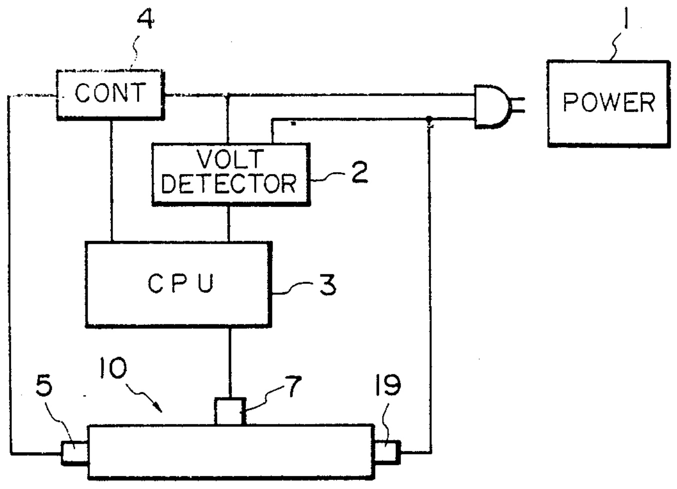
FIG. 20 is a block diagram of a control system used in an embodiment of the present invention.

Referring to FIG. 20, a further embodiment of the present invention will be described, wherein the heating roller 29 of the fixing device 19 is a thermister 7 as means for detecting the temperature of the heating roller 19. The thermister is disposed about a longitudinal center of the roller.

The heater for the heating roller 19 provided with the thermister 7 at its surface is connected in series with respect to the heater control circuit 4 which is an electric heat generating element control circuit, and the heater control circuit 4 is connected to a power source 1. The power source 1 can provide a voltage ranging from 85 V to 264 V, for example.

A voltage detection circuit 2 for detecting the voltage of the power source 1 is connected in parallel with respect to the heater 5. The voltage detection signal provided by the voltage detection circuit 2 is transmitted to the CPU 3. The output of the thermister 7, that is, the temperature detection signal by the thermister 7 is transmitted to the CPU 3. In accordance with the temperature detecting signal from the thermister 7 and the voltage detection signal, the CPU 3 produces to the heater control circuit 4 an output signal for on-off control of the energization of the heater 23 from the source 1, whereby the surface temperature of the heating roller 19 is maintained with a predetermined range.

In the image forming apparatus according to this embodiment, when the power is supplied from the power source, the voltage of the power source 1 applied to the heater 5 of the heating roller 19 is detected by a voltage detection circuit 2, and the voltage detection signal provided by the voltage detection circuit 2 is transmitted to the CPU 3, and the voltage of the power source 1 is supplied to the heater 5 of the heating roller 19.

When the heater 5 of the heating roller 19 is supplied with the voltage from the power source in this manner, the thermister 7 for the heating roller 19 operates, and the temperature detection signal provided by the thermister 7 is transmitted to the CPU 3, which discriminates on the basis of the voltage detection signal and the temperature detection signal as to whether the temperature of the heating roller 19 is within a proper range for the image fixing. If it is outside the predetermined proper range, the CPU produces a signal to the heater control circuit 4 to on-off control the heater control circuit 4 so as to on-off control the voltage application to the heater 5 to provide a temperature within the predetermined range proper for the image fixing along the longitudinal direction of the heating roller 19. Referring to Table 4 and FIG. 21, the description will be made as to the maintenance of the temperature of the heating roller 19 within a predetermined temperature range proper for the image fixing along the length thereof, even if the voltage of the power source changes.

Table 4 shows the effective power of the heater and the thermal characteristics of the heating roller 19 when the heater 5 according to this embodiment is used with the voltage ranging from 85 V to 264 V.

TABLE 4

Temp. Rise Characteristics of Heating Roller

| SOURCE VOLT. (V) | HEATER POWER (W) | TEMP. RISE SPEED (°C./S) | TEMP. RISE PERIOD (S) | MAX. DIFFERENCE IN SET TEMP. (°C.) |
|---|---|---|---|---|
| 85 | 251 | 1.9 | 83 | 9.5 |
| 100 | 322 | 2.6 | 62 | 13.0 |
| 115 | 400 | 3.3 | 49 | 16.5 |
| 127 | 466 | 3.9 | 41 | 19.5 |
| 187 | 845 | 7.5 | 22 | 37.5 |
| 220 | 1086 | 9.7 | 17 | 48.5 |
| 240 | 1241 | 11.2 | 15 | 56.0 |
| 264 | 1438 | 13.0 | 13 | 65.0 |

In Table 4, a maximum difference between a first set temperature, for example, and a second set temperature which is a heating roller temperature for the stand-by state, are also given when the time delay from the image formation start to the image fixing operation start is 5 sec..

The heater powers given therein are maximums providing temperature increase in 5 sec.

In this embodiment, as shown in Table 5 below, the second set temperature which is the temperature of the heating roller in the stand-by state is stepwisely (T1–T5) in accordance with the power source voltage. In the apparatus of this embodiment, it takes 5 sec. from the image formation start to the image fixing operation start, as described hereinbefore, in the stand-by state (the state in which the image formation start is instantaneously possible, wherein the heating roller is set to a second set temperature).

TABLE 5

| SOURCE VOLTAGE (V) | REGION | DIFFERENCE IN (°C.) | SECOND TEMP. (°C.) |
|---|---|---|---|
| 85–100 | I | 8 | 172 (T1) |
| 100–115 | II | 12 | 168 (T2) |
| 115–187 | III | 18 | 162 (T3) |
| 187–220 | IV | 35 | 145 (T4) |
| 220–264 | V | 45 | 135 (T5) |

As will be understood from Tables 4 and 5, in this embodiment, the second set temperature is changed in accordance with the voltage of the power source, and is set so that the image fixing temperature is reached in 5 sec. In this embodiment, the voltage of the power source is detected by the source voltage detection circuit 2 shown in FIG. 20, and in accordance with Table 5, the apparatus is kept in the stand-by state with the second set temperature predetermined. By further finely dividing the voltage, more efficient second set temperature can be determined.

Figure 21:
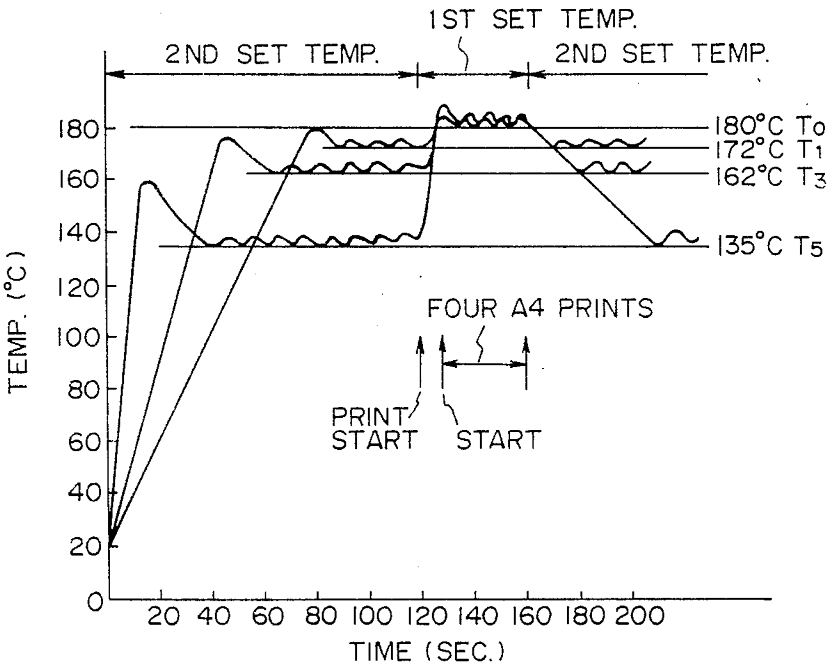
FIG. 21 is a graph showing a fixing roller temperature change vs. time, in an embodiment of the present invention.

FIG. 21 shows a specific example wherein the temperature of the heating roller 19 is shown with time when the second set temperatures are T1, T2 and T5.

In FIG. 21, a curve (1) indicates the temperature rise characteristic from the room temperature (20° C.) and the temperature change at the time of stand-by period and the printing period when the voltage is within I region (85–100 V), and the second set temperature is T1 (172° C.). A curve (2) indicates the temperature rise characteristic from the room temperature (20° C.) and the temperature change at the stand-by period and the printing period when the voltage is in III region (115–187 V), and the second set temperature T3 is 162° C. A curve (3) indicates the temperature rise characteristic from the room temperature (20° C.) and the temperature change in the stand-by state and the printing period when the voltage is in V region (220–264 V), and the second set temperature is T1 (135° C.).

In this embodiment, the effects of the present invention are remarkable particularly when the voltage is high. However, even with the voltage of approximately 100 V, it is effective by finely dividing the voltage range. As described hereinbefore, the temperature of the heating roller 20 in the stand-by state, that is, the second set temperature is changed in accordance with the power source voltage, and therefore, the power consumption of the image forming apparatus can be effectively reduced, and the temperature increase inside and outside the image forming apparatus can be minimized.

Figure 22:
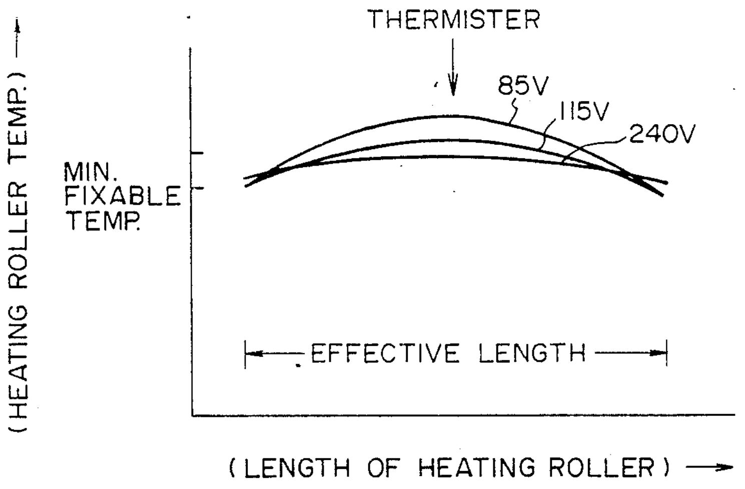
FIGS. 22, 23, 24, 25 and 26 are graphs of a temperature vs. a longitudinal position of a fixing roller.

FIG. 22 shows the temperature distribution of the heating roller 19 in this embodiment. The apparatus is designed to perform the image fixing operation at 190° C., when the voltage of the power source is 85 V, at 185° C. when the voltage is 115 V, and at 180° C. when the voltage is 240 V. As shown in FIG. 22, the image fixing processing temperature is changed in accordance with the voltage of the power source, and therefore, the minimum fixable temperature can be exceeded over the effective length for the image fixing even with a low voltage source. In addition, when the voltage is high, the power consumption can be reduced.

Figure 23:
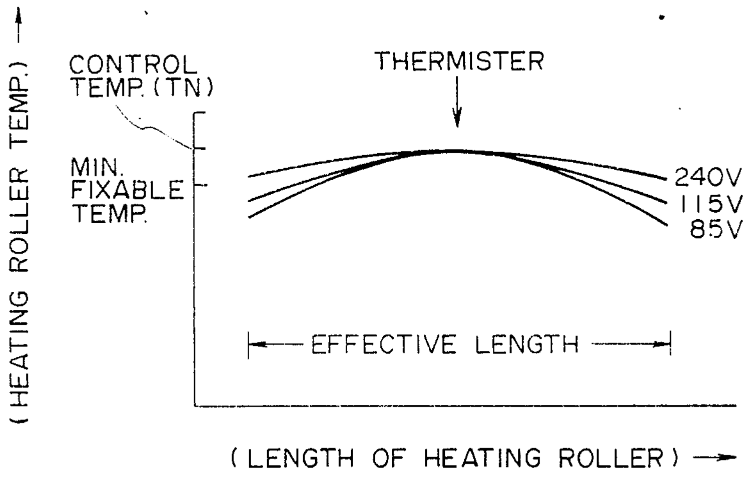

FIG. 23 shows, as a comparison example, the temperature distribution when the image fixing operation is performed immediately after the heating roller is heated from the room temperature.

In FIG. 23, a temperature detector (thermister) is disposed at the center of the heating roller, and the temperature distribution over the effective length is shown for each of 85 V, 115 V and 240 V of the voltage source.

The control temperature TN shown in FIG. 23 is the set temperature for the heating roller, and the minimum fixable temperature is a minimum temperature of the heating roller required for good image fixing operation.

As will be understood from FIG. 23, the temperature distribution along the length of the heating roller varies depending on the voltage applied to the heater 5. The reason is considered as follows.

The temperature of the heating roller is influenced by the amount of heat generation by the halogen heater which is a heat generating element, the amount of natural heat radiation of the heating roller itself and the heat transfer from the heating roller to the transfer material. Assuming that the amount of heat generation of the heat is small, the amount of heat radiation per unit time of the heating roller does not change, so that the temperature decreases at ends of the heating rollers where the natural heat radiation is large. Particularly, when the heat fixing apparatus is started, that is, when the ambient temperature is low, the heater energization period is long, so that the temperature decrease is remarkable. In the comparison example, the thermister is disposed to the center of the heating roller, and therefore, the central portion thereof is temperature-controlled, so that it is maintained at substantially constant temperature. When the voltage of the power source is 240 V in FIG. 23, the minimum fixable temperature is exceeded over the entire effective length of the heating roller, thus providing good fixing performance, but when the voltage is 115 V or 85 V, the temperature is lower than the minimum fixable temperature at ends of the heating roller, which would result in insufficient image fixing operation.

Figure 24:
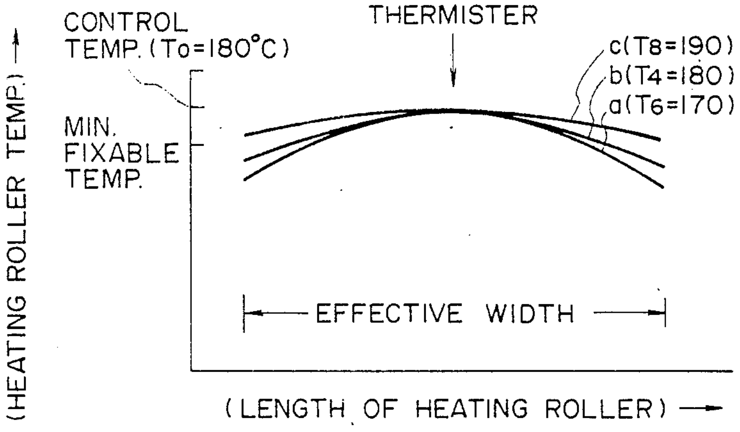
Figure 25:
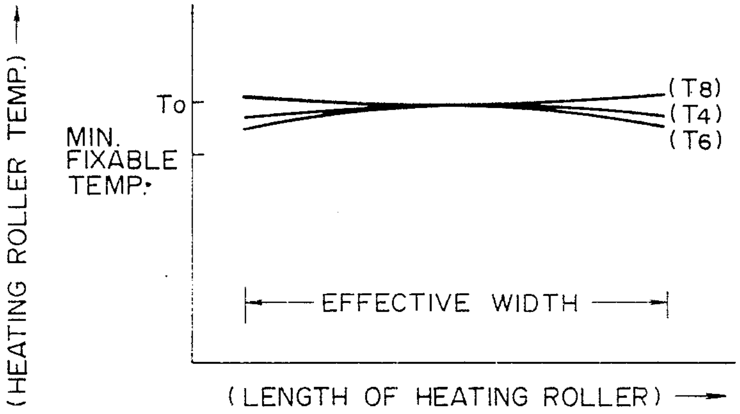

FIG. 24 shows a temperature distribution along the length of the heating roller 19 when the heat-fixing image fixing apparatus having the characteristics given in Table 3 is operated with the 85 V power source. In FIG. 24, the curve a indicates the distribution when the second set temperature is 170° C. (T6); the curve b is the distribution when the second set temperature is 180° C. (T7, T0); a curve c is the distribution when the second set temperature is 190° C. (T8) The distributions are those when the heating roller 19 is heated from the room temperature (20° C.), and is temperature-controlled by the second set temperature, and then, the image fixing operation is performed with the first set temperature (T0=180° C.). FIG. 25 shows an example when the voltage of the power source, is 220 V in the embodiment described with reference to FIG. 24.

As shown in FIG. 24, the temperatures at the ends of the heating roller 19 tends to become low when the voltage is 85 V, and when the second set temperature is low, insufficient image fixing occurs at lateral ends of an image. However, that is cured if the second set temperature is set higher (T8 =190° C.). In accordance with this embodiment, it will be understood that the minimum fixable temperature can be exceeded over the entire effective length of the fixing roller. On the contrary, as shown in FIG. 25, when the voltage of the voltage source is 220 V, the minimum fixable temperature is exceeded even if the second set temperature is low.

As will be understood from the above, when the voltage is low, the second set temperature is set higher than the first set temperature, by which the temperature decrease by the heat radiation of the roller itself can be prevented, and the image quality immediately after the heating roller is heated can be stabilized; and when the voltage is high, the second set temperature is set low, by which the power consumption can be reduced. It is a possible alternative that limitedly when the voltage is low, the image fixing process temperature, during a predetermined period immediately after the temperature rise, is set to the second set temperature which is higher than the first set temperature, thus maintaining a predetermined temperature over the effective length.

Figure 26:
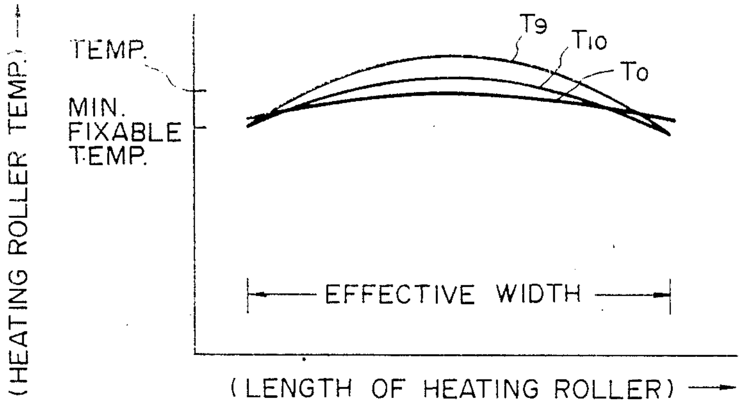

FIG. 26 shows this example, wherein when the voltage is 85 V, the image fixing operation is effected with the second set temperature (T9) immediately after the start of the temperature rise after the power-on. After 10 min. elapses, the temperature is set to T10 (185° C.), and after 20 min. elapses, the image fixing operation is performed with the first set temperature. FIG. 26 shows the temperature distribution along the length of the heating roller 19 in this case. By changing the second set temperature in this manner, the minimum fixable temperature is exceeded even at the low voltage state immediately after the start to stabilize the image quality. On the contrary, when the voltage is high, the second set temperature is set lower to reduce the power consumption.

Another embodiment wherein the set temperature is changed in accordance with the voltage of the power source will be described.

Figure 27:
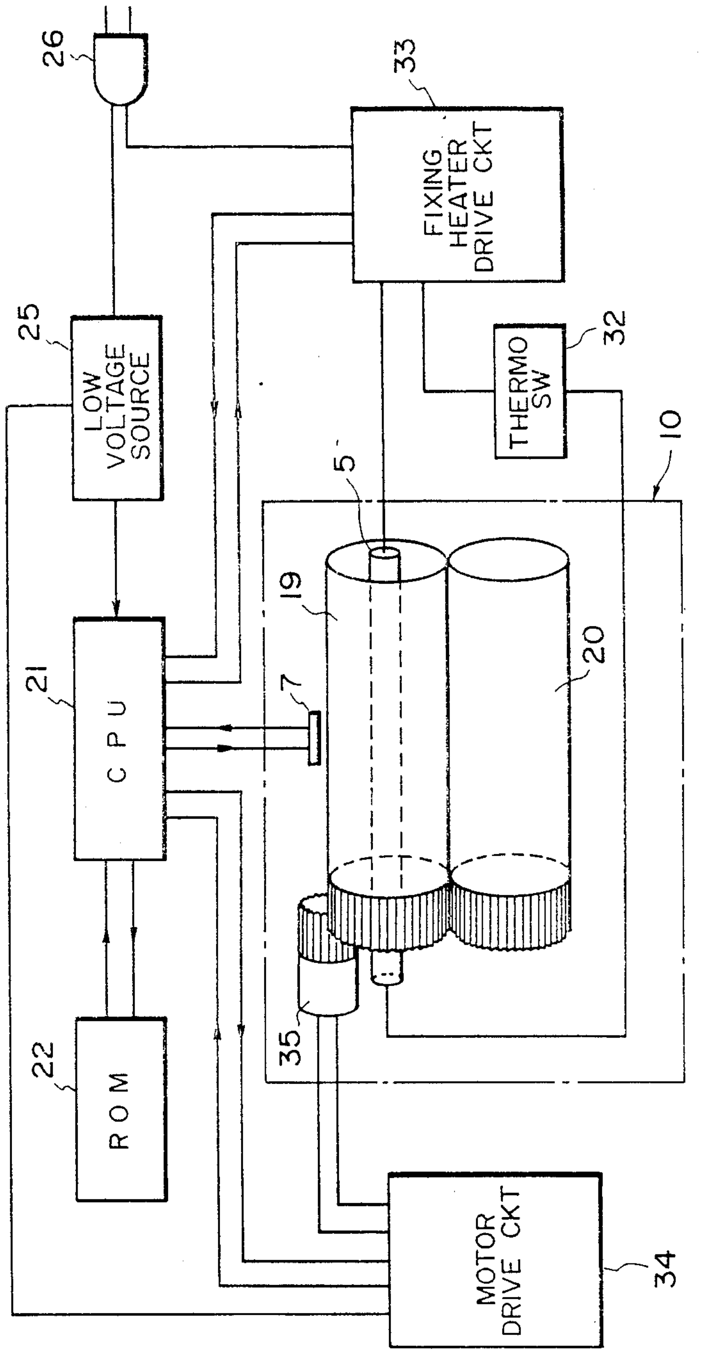
FIG. 27 is a block diagram of a control system according to a further embodiment of the present invention.

Referring to FIG. 27, there is shown a block diagram for this embodiment.

Figure 28:
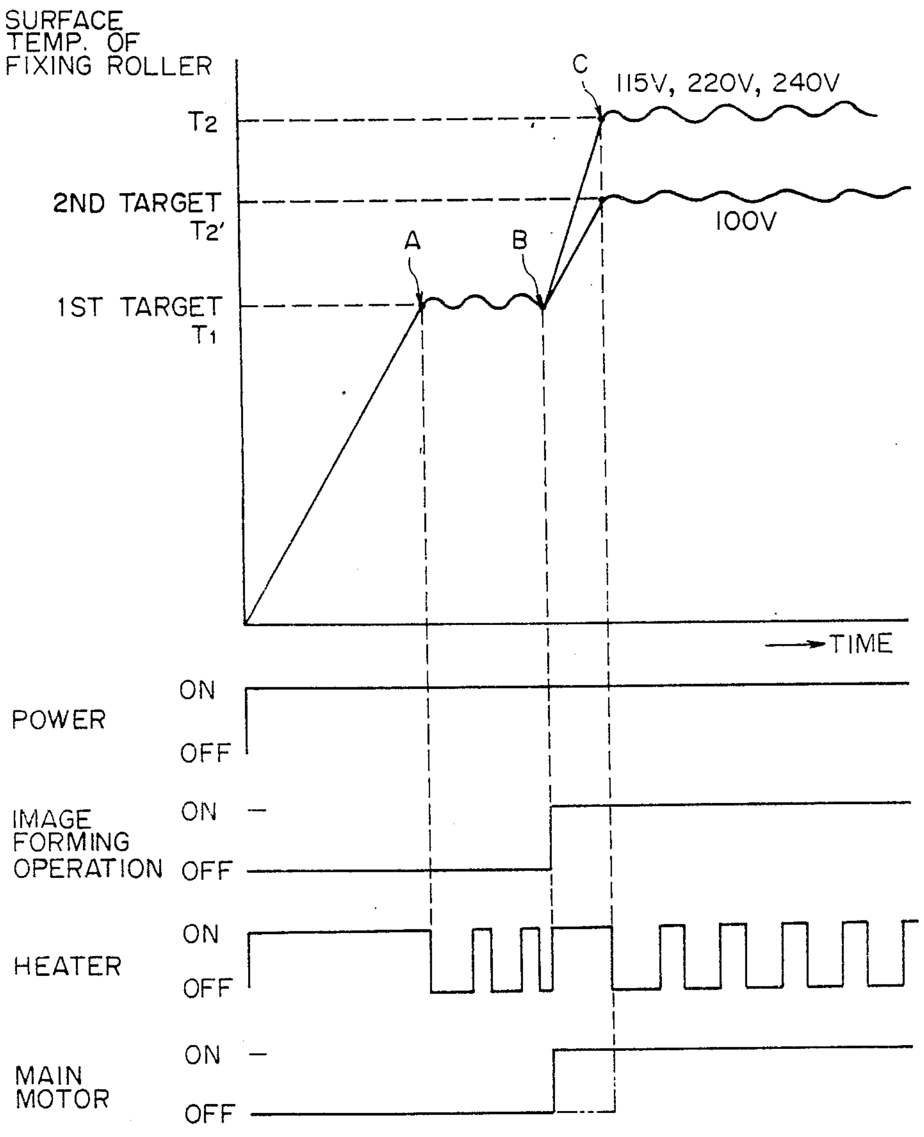
FIGS. 28 and 29 are graphs of a surface temperature of a fixing roller vs. time.

When the control operation is started by the CPU 21, the surface temperature of the heating roller 19 is controlled as shown in FIG. 28. This Figure shows the surface temperature of the fixing roller 19 vs. time to show the behavior of the control operation, together with the on-off state of the power source, image forming operation, heater and the main motor. First, the CPU 21 increases the surface temperature of the fixing roller 19 to a first target temperature T1 (160° C. in this embodiment) which is determined for a pre-heating temperature and which is lower than the fixing temperature. At the point of time A when the thermister 7 detects that the surface temperature of the fixing roller 9 reaches the target temperature, the image forming operation can be instructed, and the apparatus is waiting for the instructions. The first target temperature T1 is predetermined in consideration of the voltage difference of the commercial power source so that the surface temperature can be increased to the fixing temperature in the short period of time corresponding to the time from the supply of the recording material, which is an image bearing member for bearing the unfixed image, to reach the image fixing apparatus. By doing so, the quick temperature increase from the first target temperature to the fixing temperature at each voltage is made possible. When the image forming operation is started by the starting instructions, the CPU 21 starts at the point of time B (starting point) to increase the temperature to the second target temperature T2 (T2') which is set as a fixing temperature corresponding to the voltage of the power source. The surface temperature of the fixing roller 19 reaches the second target temperature T2 (T2') in a short period of time corresponding to the time required for the recording material is supplied from the supply station to receive an unfixed image at a developing station and to reach the image fixing station. Therefore, the unfixed image is sufficiently fixed without problem problem.

The second target temperature T2 (T2') set corresponding to the voltage of the power source will be described in detail. The apparatus of this embodiment is usable with 100 V, 115 V, 220 V and 240 V. The heater disposed inside the fixing roller 19 is a halogen heater having a rated voltage of 240 V and rated power of 1100 W. When the heater is used with 100 V, the heater power is reduced to approximately 26 % of that at 240 V. If the sequence of 240 V is used as it is, a very long period is required for the surface temperature of the fixing roller to reach the predetermined temperature. Therefore, when 100 V is used, the surface temperature of the fixing roller 19 is controlled with the second target temperature T2' (approximately 170° C. in this embodiment) which is lower than the second set temperature T2 (approximately 180° C. in this embodiment) when the voltages of 115 V, 220 V and 240 V are used. The fixing temperature when 100 V is used is determined as being approximately 170° C. which is approximately 10° C. lower than the above described 180° C. However, the image fixing performance is not influenced at all practically.

In the foregoing embodiment, the switching of the second temperature between T2 and T2', is effected by transmitting a signal produced when a switching is performed between 100 V or 115 V side and 220 V/240 V side. However, a switch exclusively for the second set temperature T2 and T2' may be provided, and the temperature is switched by transmitting the signal therefrom to the CPU 21.

In the foregoing embodiment, the surface temperature of the fixing roller 19 detected by the thermister 7 reaches the first target temperature T1, the image forming operation can be instructed, the main motor 15 rotates instantaneously from the start instruction. The temperature rise from the first target temperature T1 to the second target temperature T2 (T2') is quickly effected, and therefore, at the point of time C when the thermister 7 detects the reaching of the temperature to the second target temperature T2 (T2'), the main motor 35 is started to rotate. If the control is so determined, the image fixing performance can be more surely guaranteed.

Figure 29:
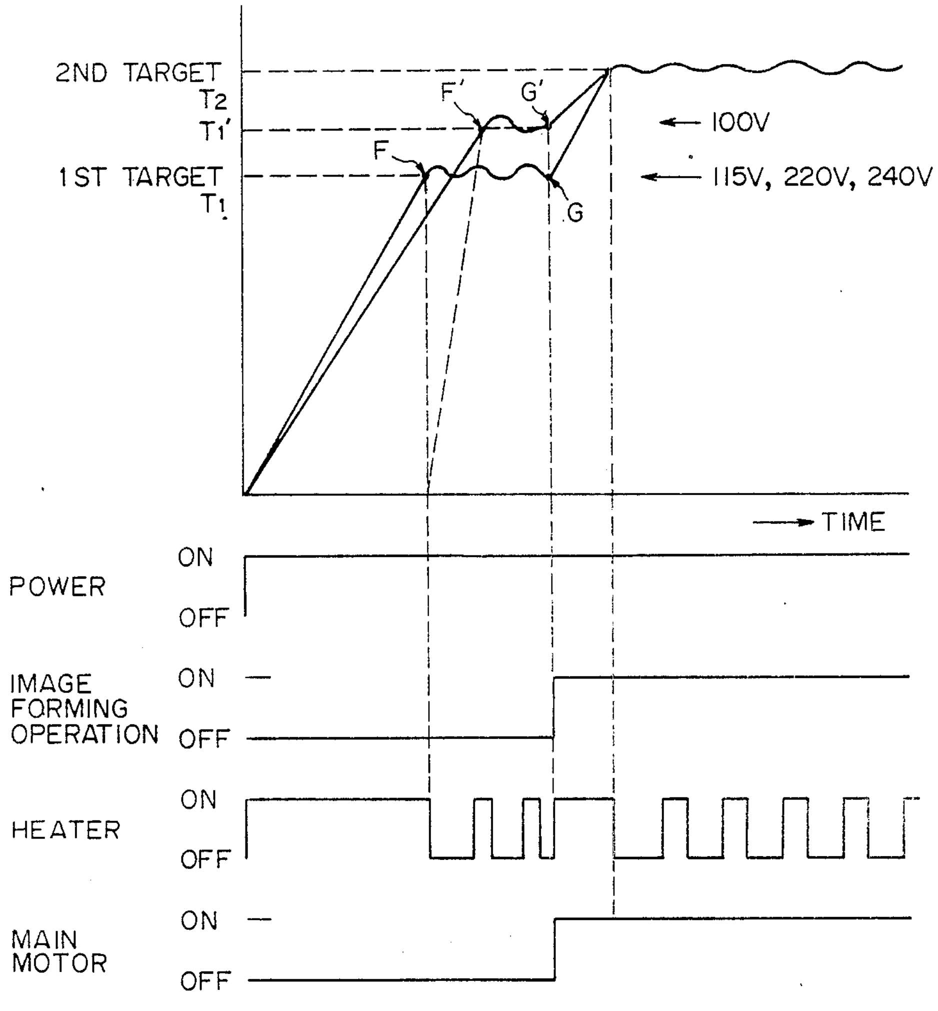

Referring to FIG. 29, a further embodiment of the present invention will be described. In the embodiment described with FIG. 28, the second target temperature which is the image fixing temperature is changed in accordance with the voltage of the power source used. In the present embodiment, however, the second target temperature which is the fixing temperature is set constant irrespective of the voltage of the power source to sufficiently assure the image fixing performance. In this embodiment, for the voltages of 115 V, 220 V and 240 V, the first target temperature is set lower than that for 100 V in consideration of the fact that the heater power is large, and therefore, the temperature rise speed is high when the voltages are 115 V, 220 V, 240 V.

Referring to FIG. 29, the second target temperature T2 is not changed depending on the voltages of the power source, but the first target temperature is T1 when the voltage is 115 V, 220 V or 240 V, which is different from the temperature T1' for 100 V. The temperatures T1 and T1' are determined in consideration of the power difference produced by the voltage difference of the power source used. The temperature T1' for 100 V is higher than the temperature T1 for 115 V, 220 V and 240 V. The temperatures T1 and T1' are the same as in the foregoing embodiment, and are so determined that the second target temperature is quickly reached within the time period required for the recording material to reach the image fixing station when each of the voltages are used.

Accordingly, in this embodiment, the instructions of image formation can be inputted at the point of time F when the surface temperature of the fixing roller reaches T1, in the case where 115 V, 220 V or 240 V is used. At the point of time G, when the instruction is inputted, the temperature rise to the second target temperature T2 and the image forming operation start. When 100 V is used, the instruction can be inputted at the point of time F' when the surface temperature of the fixing roller reaches T1' When the instructions are inputted at the point of time G', the temperature rise to the second target temperature T2 and the image forming operation are started.

As described, the first target temperature is so set that the second target temperature is quickly reached corresponding to the voltages of the power sources, and therefore, the second target temperature, that is, the image fixing temperature can be set to be a constant predetermined temperature irrespective of the voltage change, thus, the sufficient image fixing performance can be assured.

In this embodiment, similarly to the embodiment of FIG. 28, the instruction input is possible when the first target temperature T1 (T1') is reached, and the image forming operation can be started instantaneously by the input. However, it is possible that the control is so effected that the image forming operation is started when the temperature rise to the second target temperature T2 is completed.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
means operable with a first rated voltage and with a second rated voltage which is different from the first rated voltage; and
control means for controlling an image forming condition in accordance with the rated voltage.

2. An apparatus according to claim 1, wherein the first rated voltage is not less than twice the second rated voltage.

3. An apparatus according to claim 1, further comprising means for forming an unfixed image on an image supporting member, and image fixing means for fixing the unfixed image on the image supporting member, wherein said image forming condition is concerned with said image fixing means.

4. An apparatus according to claim 3, wherein said fixing means includes a heater for heating the unfixed image.

5. An apparatus according to claim 1, further comprising means for detecting a voltage with which said apparatus is used.

6. An image forming apparatus, comprising:
means operable with a first rated voltage and a second rated voltage which is different from the first rated voltage;
means for forming an unfixed image on an image supporting member;
means for fixing the unfixed image on the image supporting member;
said fixing means including a heating roller heated by a heater and a back-up roller contacted to said heating roller, said rollers starting rotation under a predetermined condition, wherein said predetermined condition is different between when said apparatus is used with the first rated voltage and when it is used with the second rated voltage.

7. An apparatus according to claim 6, wherein the first rated voltage is not less than twice the second rated voltage.

8. An apparatus according to claim 6, further comprising means for detecting a voltage with which said apparatus is used.

9. An apparatus according to claim 6, wherein when a surface temperature of the heating roller reaches a predetermined temperature, said rollers start to rotate, and wherein the predetermined temperature is different for the first rated voltage and for the second rated voltage.

10. An apparatus according to claim 6, wherein the rollers continue to rotate until the surface temperature of the heating roller reaches a predetermined temperature which is higher than the aforementioned predetermined temperature for the rotation start.

11. An apparatus according to claim 10, wherein the rotation of the rollers continues until the surface temperature of the heating roller reaches said higher temperature twice.

12. An apparatus according to claim 9, wherein the rollers stop rotation after the rotation is continued for a predetermined period of time.

13. An image forming apparatus, comprising:
means operable with a first rated voltage and with a second rated voltage which is different from the first rated voltage;
means for forming an unfixed image on an image supporting member;
means for fixing the unfixed image on said supporting member;
said fixing means including a heating member heated by a heating source to maintain a temperature of its surface at a predetermined temperature, said heating member is temperature-controlled to reach the predetermined temperature in a manner of temperature control which is different between when said apparatus is used with the first rated voltage and when it is used with the second rated voltage.

14. An apparatus according to claim 13, wherein the first rated voltage is not less than twice the second rated voltage.

15. An apparatus according to claim 13, wherein said heating source is deenergized when the temperature of the surface of the heating member reaches a predetermined temperature which is lower than the aforementioned predetermined temperature.

16. An apparatus according to claim 13, further comprising means for detecting a voltage with which said apparatus is used.

17. An apparatus according to claim 13, wherein said second mentioned predetermined temperature is different between when said apparatus is used with the first rated voltage and when said apparatus is used with the second rated voltage.

18. An apparatus according to claim 13, wherein said heating source is energized after deenergization for a predetermined period of time, and wherein the predetermined period is different between when said apparatus is used with the first rated voltage and when it is used with the second rated voltage.

19. An apparatus according to claim 11, wherein said fixing means includes a couple of rollers forming a nip through which an image supporting member is passed, and said heating member is one of said rollers.

20. An image forming apparatus, comprising:
means operable with a first rated voltage and with a second rated voltage which is different from the first rated voltage;
means for forming an unfixed image on an image supporting member;
means for fixing the unfixed image on the image supporting member;
said fixing means including a heating source for heating the unfixed image, and a duty ratio of the power supplied to the heating source is different between when said apparatus is used with the first rated voltage and when it is used with the second rated voltage.

21. An apparatus according to claim 20, wherein the first rated voltage is not less than twice the second rated voltage.

22. An apparatus according to claim 20, further comprising means for detecting a voltage with which said apparatus is used.

23. An apparatus according to claim 20, wherein a ratio of the duty ratio for the first rated voltage and the duty ratio for the second rated voltage is a reciprocal of a ratio of the first rated voltage and the second rated voltage.

24. An apparatus according to claim 20, wherein said fixing means includes a couple of rollers forming a nip through which the image supporting member is passed, and said heating source heats one of the rollers.

25. An image forming apparatus, comprising:

means operable with a first rated voltage and with a second first rated voltage which is different from the first rated voltage;

means for forming an unfixed image on a image supporting member;

means for fixing the unfixed image on the image supporting member;

said fixing means including heating means for heating the unfixed image;

malfunction detecting means for detecting malfunction of said heating means, wherein a malfunction detecting condition with which the malfunction is detected is different between when said apparatus is used with the first rated voltage and when it is used with the second rated voltage.

26. An apparatus according to claim 25, wherein the first rated voltage is not less than twice the second rated voltage.

27. An apparatus according to claim 25, further comprising means for detecting a voltage with which said apparatus is used.

28. An apparatus according to claim 25, wherein said heating means includes a heater generating heat by being energized, and wherein when an energization period of the heater is more than a predetermined, said malfunction detecting means detects a malfunction of the heating means.

29. An apparatus according to claim 28, wherein said predetermined period is different between when said apparatus is used with the first rated voltage and when it is used with the second rated voltage.

30. An apparatus according to claim 25, wherein said heating means is a roller heated by the heating source, and energization of the heating source is controlled in accordance with a surface temperature of the roller.

31. An image forming apparatus, comprising:

means operable with a first rated voltage and with a second rated voltage which is different from the first rated voltage;

means for forming an unfixed image on the image supporting means;

fixing means for fixing the unfixed image on the image supporting member;

said fixing means including a heating source for heating the unfixed image;

said heating source is controlled by controlling energization period, and wherein the control is effected differently between when said apparatus is used with the first rated voltage and when it is used with the second rated voltage.

32. An apparatus according to claim 31, wherein the first rated voltage is not less than twice the second rated voltage.

33. An apparatus according to claim 31, further comprising means for detecting a voltage with which said apparatus is used.

34. An apparatus according to claim 31, wherein a maximum continuous energization period of the heating source is different between when said apparatus is used with the first rated voltage and when it is used with the second rated voltage.

35. An apparatus according to claim 31, wherein an energization stoppage period of the heating source is different between when said apparatus is used with the first rated voltage and when it is used with the second rated voltage.

36. An apparatus according to claim 31, wherein said fixing means includes a couple of rollers forming a nip through which the image supporting member is pressed, and wherein said heating source heats one of the rollers.

37. An image forming apparatus, comprising:

means operable with a first rated voltage and a second rated voltage which is different from the first rated voltage;

means for forming an unfixed image on an image supporting member;

fixing means for fixing the unfixed image on the image supporting member;

said fixing means including a heating member for heating the unfixed image;

control means for maintaining a temperature of said heating member at a constant level;

wherein the constant temperature is different between when said apparatus is used with the first rated voltage and when it is used with the second rated voltage.

38. An apparatus according to claim 37, wherein the first rated voltage is not less than twice the second rated voltage.

39. An apparatus according to claim 37, further comprising means for detecting a voltage with which said apparatus is used.

40. An apparatus according to claim 37, wherein said constant temperature is a temperature when an image fixing operation is performed.

41. An apparatus according to claim 37, wherein said constant temperature is a stand-by temperature before an image fixing operation is started.

* * * * *

UNITED STATES PATENT AND TRADEMARK OFFICE
CERTIFICATE OF CORRECTION

PATENT NO. : 4,937,600

DATED : June 26, 1990

INVENTOR(S) : HIROMITSU HIRABAYASHI ET AL.

It is certified that error appears in the above-identified patent and that said Letters Patent is hereby corrected as shown below:

AT COLUMN 2

Line 14, "voltage" should read --voltages--.

AT COLUMN 10

Line 33, "show" should read --shows--.

AT COLUMN 11

Line 1, "property" should read --properly--.

AT COLUMN 17

Line 34, "with" should read --within--.

UNITED STATES PATENT AND TRADEMARK OFFICE
CERTIFICATE OF CORRECTION

PATENT NO. : 4,937,600

DATED : June 26, 1990

INVENTOR(S) : HIROMITSU HIRABAYASHI ET AL.

It is certified that error appears in the above-identified patent and that said Letters Patent is hereby corrected as shown below:

AT COLUMN 20

Line 17, "power source," should read --power source--.

AT COLUMN 25

Line 28, "predetermined," should read --predetermined period,--.

Signed and Sealed this

Fourteenth Day of July, 1992

*Attest:*

DOUGLAS B. COMER

*Attesting Officer*

*Acting Commissioner of Patents and Trademarks*